(12) United States Patent
Santichen et al.

(10) Patent No.: US 9,424,972 B2
(45) Date of Patent: Aug. 23, 2016

(54) SOLENOID WITH VARIABLE RELUCTANCE PLUNGER

(71) Applicant: Remy Technologies LLC, Pendleton, IN (US)

(72) Inventors: Stephen P. Santichen, Anderson, IN (US); Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 0 days.

(21) Appl. No.: 14/267,679

(22) Filed: May 1, 2014

(65) Prior Publication Data

US 2014/0240067 A1    Aug. 28, 2014

Related U.S. Application Data

(63) Continuation of application No. 13/839,657, filed on Mar. 15, 2013, now Pat. No. 8,754,731, which is a continuation of application No. 12/887,308, filed on Sep. 21, 2010, now Pat. No. 8,421,565, which is a continuation-in-part of application No. 12/886,978, filed on Sep. 21, 2010, now Pat. No. 8,362,862.

(51) Int. Cl.

| | | |
|---|---|---|
| *H01F 3/00* | (2006.01) | |
| *H01F 7/13* | (2006.01) | |
| *H02K 41/03* | (2006.01) | |
| *F02N 19/00* | (2010.01) | |
| *H01F 7/18* | (2006.01) | |
| *H01F 7/08* | (2006.01) | |

(Continued)

(52) U.S. Cl.
CPC ............. *H01F 7/13* (2013.01); *F02N 11/087* (2013.01); *F02N 19/00* (2013.01); *H01F 7/081* (2013.01); *H01F 7/1607* (2013.01); *H01F 7/1827* (2013.01); *H01F 7/1833* (2013.01); *H02K 41/03* (2013.01); *F02N 11/0851* (2013.01); *F02N 2011/0892* (2013.01); *H01F 2007/086* (2013.01); *H01F 2007/1692* (2013.01)

(58) Field of Classification Search
CPC .................................................. H01F 2007/086
USPC .................................. 335/255, 261–264, 279
See application file for complete search history.

(56) References Cited

U.S. PATENT DOCUMENTS

| | | |
|---|---|---|
| 3,389,355 A | 6/1968 | Schroeder, Jr. |
| 3,523,676 A | 8/1970 | Barker |

(Continued)

OTHER PUBLICATIONS

Li et al., Comparison of the Performance of Round and Rectangular Wire in Small Solenoids for High-Field NMR, Magn, Reson, Chem. 44, 2006, p. 255-252, http://www.bioe.psu.edu/nmr/pdr_files/2006/yuli.pdf.

*Primary Examiner* — Ramon M Barrera
(74) *Attorney, Agent, or Firm* — Maginot, Moore & Beck LLP

(57) ABSTRACT

A solenoid for a vehicle starter includes at least one coil with a passage extending through the coil in an axial direction. The solenoid further includes a plunger configured to move in the axial direction within the passage. The plunger includes a cylindrical outer surface with a substantially uniform diameter and a circumferential notch. The cylindrical outer surface includes a first portion with a first diameter on one side of the circumferential notch, and a second portion with the first diameter on an opposite side of the circumferential notch. The circumferential notch includes a portion with a second diameter that is less than the first diameter.

18 Claims, 24 Drawing Sheets

(51) Int. Cl.
  *F02N 11/08* (2006.01)
  *H01F 7/16* (2006.01)

(56) References Cited

U.S. PATENT DOCUMENTS

| | | | |
|---|---|---|---|
| 3,549,917 A * | 12/1970 | Weyer et al. | 310/14 |
| 3,763,412 A | 10/1973 | Detrick et al. | |
| 4,067,541 A | 1/1978 | Hunter | |
| 4,215,283 A | 7/1980 | Hinds | |
| 4,551,630 A | 11/1985 | Stahura et al. | |
| 4,862,123 A | 8/1989 | Gray et al. | |
| 5,915,665 A | 6/1999 | Paese et al. | |
| 6,633,099 B2 | 10/2003 | Fulton et al. | |
| 6,930,409 B1 | 8/2005 | Smith | |
| 7,145,259 B2 | 12/2006 | Spellman et al. | |
| 7,331,564 B2 | 2/2008 | Moreno et al. | |
| 7,647,943 B2 | 1/2010 | Kleinert et al. | |
| 2002/0158519 A1 | 10/2002 | Fulton et al. | |
| 2003/0107016 A1 | 6/2003 | Burrola et al. | |
| 2005/0099256 A1 | 5/2005 | Subramanian et al. | |
| 2007/0267922 A1 * | 11/2007 | Uni | H01F 7/081 310/26 |
| 2008/0297288 A1 | 12/2008 | Irwin | |

* cited by examiner

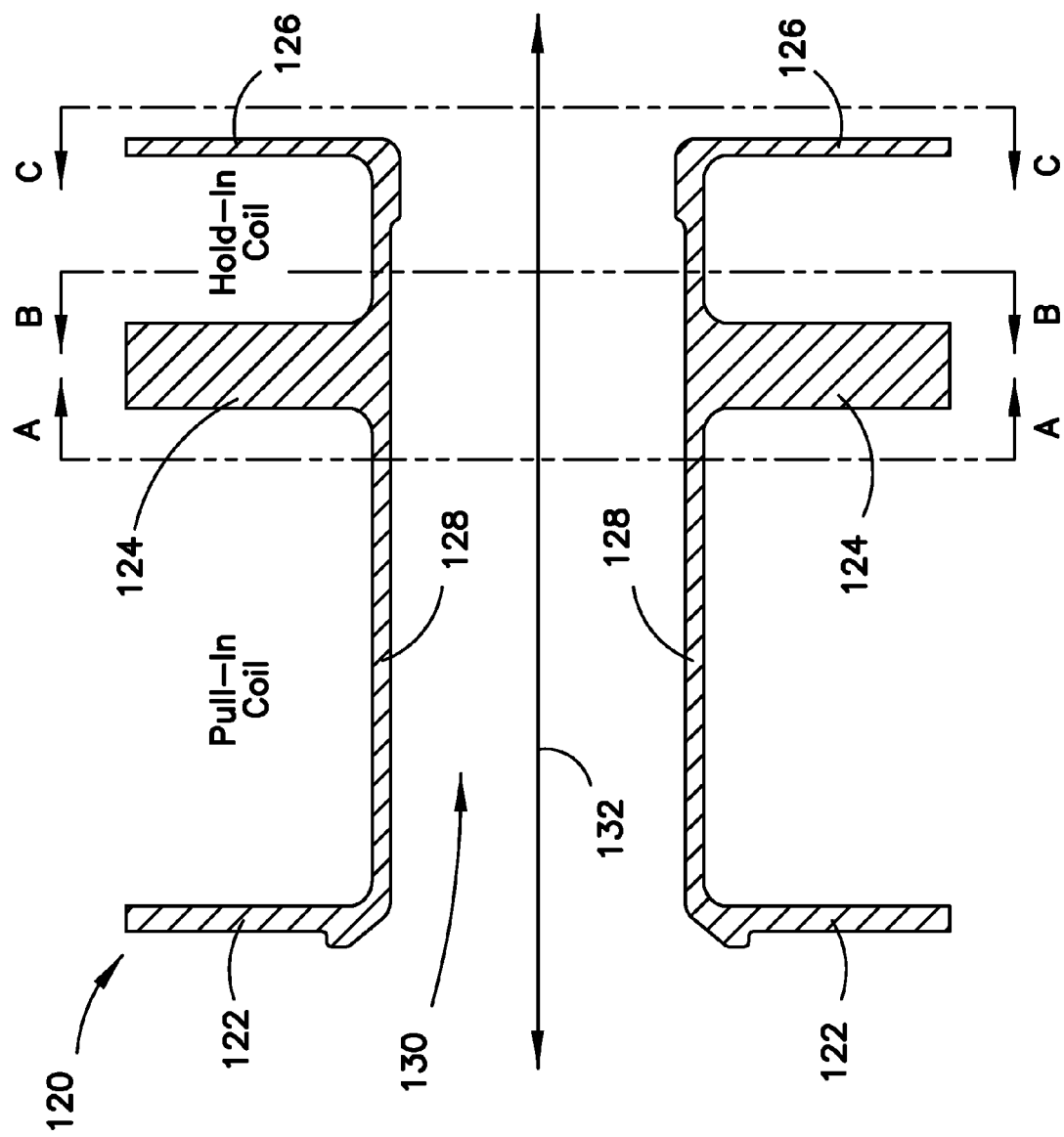

SOLENOID WITH VARIABLE RELUCTANCE PLUNGER

CROSS-REFERENCE TO RELATED APPLICATIONS

This application is a continuation of U.S. patent application Ser. No. 13/839,657, filed Mar. 15, 2013, which is a continuation of U.S. patent application Ser. No. 12/887,308, filed Sep. 21, 2010, now U.S. Pat. No. 8,421,565, which is a continuation-in-part of U.S. patent application Ser. No. 12/886,978, also filed Sep. 21, 2010, now U.S. Pat. No. 8,362,862.

FIELD

This relates to the field of vehicle starters, and more particularly, to solenoids for starter motor assemblies.

BACKGROUND

Starter motor assemblies that assist in starting engines, such as engines in vehicles, are well known. A conventional starter motor assembly is shown in FIG. 15. The starter motor assembly 200 of FIG. 23 includes a solenoid 210, an electric motor 202, and a drive mechanism 204. The solenoid 210 includes a coil 212 that is energized by a battery upon the closing of an ignition switch. When the solenoid coil 212 is energized, a plunger 216 moves in a linear direction, causing a shift lever 205 to pivot, and forcing a pinion gear 206 into engagement with a ring gear of a vehicle engine (not shown). When the plunger 216 reaches a plunger stop, electrical contacts are closed connecting the electric motor 202 to the battery. The energized electric motor 202 then rotates and provides an output torque to the drive mechanism 204. The drive mechanism 204 transmits the torque of the electric motor through various drive components to the pinion gear 206 which is engaged with the ring gear of the vehicle engine. Accordingly, rotation of the electric motor 202 and pinion 206 results in cranking of the engine until the engine starts.

Many starter motor assemblies, such as the starter motor assembly 200 of FIG. 15 are configured with a "soft-start" starter motor engagement system. The intent of a soft start starter motor engagement system is to mesh the pinion gear of the starter into the engine ring gear before full electrical power is applied to the starter motor. If the pinion ring gear abuts into the ring gear during this engagement, the motor provides a small torque to turn the pinion gear and allow it to properly mesh into the ring gear before high current is applied. The configuration of the solenoid, shift yoke, electrical contacts, and motor drive are such that high current is not applied to the motor before the gears are properly meshed. Accordingly, milling of the pinion gear and the ring gear is prevented in a starter motor with a soft-start engagement system.

Starters with a soft start engagement system, such as that of FIG. 15, typically include a solenoid with two distinct coils. The first coil is a pull-in coil 212 and the second coil is a hold in coil 214. As shown in FIG. 15, the pull-in coil 212 is wound first on the spool 220. On top of this winding the hold-in coil 214 is wound. Sometimes this order is reversed such that the hold-in coil 214 is wound first on the spool 220 followed by the pull-in coil 212.

During operation of the starter, the closing of the ignition switch (typically upon the operator turning a key) energizes both the pull-in coil 212 and the hold-in coil 214. Current flowing through the pull-in coil 212 at this time also reaches the electric motor 202, applying some limited power to the electric motor, and resulting in some low torque turning of the pinion. Energization of the pull-in coil 212 and hold-in coil 214 moves a solenoid shaft (also referred to herein as the "plunger") in an axial direction. The axial movement of the solenoid plunger moves the shift lever 205 and biases the pinion gear 206 toward engagement with the engine ring gear. Once the solenoid plunger reaches the plunger stop, a set of electrical contacts is closed, thereby delivering full power to the electrical motor. Closing of the electrical contacts effectively short circuits the pull-in coil 212, eliminating unwanted heat generated by the pull-in coil. However, with the pull-in coil is shorted, the hold-in coil 214 provides sufficient electromagnetic force to hold the plunger in place and maintain the electrical contacts in a closed position, thus allowing the delivery of full power to continue to the electric motor 202. The fully powered electric motor 202 drives the pinion gear 206, resulting in rotation of the engine ring gear, and thereby cranking the vehicle engine.

After the engine fires (i.e., vehicle start), the operator of the vehicle opens the ignition switch. The electrical circuit of the starter motor assembly is configured such that opening of the ignition switch causes current to flow through the hold-in coil and the pull-in coil in opposite directions. The pull-in coil 212 and the hold-in coil 214 are configured such that the electromagnetic forces of the two coils 212, 214 cancel each other upon opening of the ignition switch, and a return spring forces the plunger 216 back to its original un-energized position. As a result, the electrical contacts that connected the electric motor 202 to the source of electrical power are opened, and the electric motor is de-energized.

In order to produce a high performing vehicle starter with a soft start motor engagement system, such as that described above, designers are faced with numerous design challenges. First, the pull-in coil must be properly designed to avoid various issues that may arise during operation of the starter. As described above, when the pull-in coil of a soft-start starter motor engagement system is energized (i.e., when the ignition switch contacts close due to operator turning engine switch key on), the pull-in coil provides electromagnetic force to pull the plunger toward the plunger stop and to the closed position. However, the pull-in coil is connected electrically in series with the starter motor, and should only have a low resistance. With low resistance through the pull-in coil, sufficient current flows through the pull-in coil and to the electric motor such that the electric motor can deliver a sufficient output torque to rotate the pinion gear and avoid abutment with the ring gear, as described previously. This required torque is typically 8-12 N-m. For a 12V motor, the resistance may be on the order of 0.030 ohms so that several hundred amps flow through the motor, and also the series connected pull-in coil, during soft start. However, this low of resistance of the pull-in coil creates other design challenges. First, if the soft start period is prolonged, or repetitive starts are performed, a high amount of ohmic heat is generated in the pull-in coil because of the large amount of current flowing through the pull-in coil. For a 12V system this can be on the order of 3-4 kW, and this can lead to thermal failure of the insulation system of the wiring that forms the coils. Second, the large current through the pull-in coil creates a much stronger electromagnetic force on the plunger during closure than is needed. This may become a problem when an abutment between the pinion gear and ring gear occurs, and the impact force of the pinion gear on the ring gear can exceed 4500N. As a result, the ring gear could fracture or chip. Over time and thousands of starts, the surface of the ring gear may deteriorate and require replacement for proper starting.

Design challenges related to the pull-in coil, such as those discussed in the preceding paragraph result in additional design challenges with respect to other components of the starter, such as the hold-in coil. For example, as discussed in the previous paragraph, the pull-in coil has specific design limitations related to the current flowing through the pull-in coil. Since the electromagnetic excitation is the product of coil turns times current, and since current is fixed, this generally leaves the number of turns of the pull-in coil as the primary design variable for the pull-in coil. While the number of turns of the pull-in coil can be reduced to reduce the impact abutment force issue described previously, this presents a problem with the hold-in coil. In particular, the number of turns in the hold-in coil should match the pull-in coil so that during disengagement of the pinion gear and the ring gear following vehicle start, the electromagnetic forces of the two coils will cancel each other and allow the pinion gear to pull cleanly out of the ring gear. However, before vehicle start, the hold-in coil stays energized for a much longer period of time than the pull-in coil. Therefore, the hold-in coil should not be of low resistance or it will thermally fail. Thus, the resistance of the hold-in coil generally is an order of magnitude higher than that of the pull-in coil. The high resistance of the hold-in coil means that current flow through the hold-coil before start is relatively low, resulting in a relatively low amp-turn product. If the number of turns of the hold-in coil is too low, then the hold-in coil will deliver an insufficient magnetic force to hold the plunger closed and the starter motor will disengage before vehicle start.

As explained in the previous paragraphs, designers of vehicle starters with soft start motor engagement systems are faced with opposing design challenges for two coils that should produce equivalent electromagnetic forces. On the one hand designers strive to limit the turns of the pull-in coil in order to reduce the impact force during engagement of the pinion gear and the ring gear. On the other hand designers strive to increase the turns of the hold-in coil such that the hold-in coil delivers sufficient electromagnetic force to maintain the plunger in a closed position during engine cranking. Accordingly, it would be desirable to provide a solenoid for a vehicle starter with a pull-in coil that limits the impact force during engagement of the pinion gear and the ring gear. It would also be desirable to provide a hold-in coil for the solenoid that delivers sufficient electromagnetic force to maintain the plunger in a closed position during engine cranking. Additionally, it would be desirable if such a solenoid were relatively simple in design and inexpensive to implement.

SUMMARY

In accordance with one exemplary embodiment of the disclosure, there is provided a solenoid for a vehicle starter. The solenoid includes at least one coil with a passage extending through the coil in an axial direction. The solenoid further includes a plunger configured to move in the axial direction within the passage. The plunger includes a cylindrical outer surface with a substantially uniform diameter and a circumferential notch. The cylindrical outer surface includes a first portion with a first diameter on one side of the circumferential notch, and a second portion with the first diameter on an opposite side of the circumferential notch. The circumferential notch includes a portion with a second diameter that is less than the first diameter.

In at least one embodiment a solenoid for a vehicle starter comprises at least one coil with a passage extending through the coil. The solenoid further comprises a plunger with a unitary component positioned within the passage and configured to slide within the passage in an axial direction between a first position and a second position. The unitary component of the plunger includes a cylindrical outer surface with a circumferential notch formed in the cylindrical outer surface between a first end and a second end of the cylindrical outer surface. A radial wall is separated from the unitary component of the plunger by a radial distance, and the radial distance varies when the plunger moves from the first position to the second position.

In at least one embodiment, a solenoid for a vehicle starter includes at least one coil with a passage extending through the coil in an axial direction, and a plunger configured to move in the axial direction within the passage. The plunger includes a unitary component having a cylindrical outer surface with a substantially uniform diameter and a circumferential notch. The cylindrical outer surface includes a first portion with a first diameter on one side of the circumferential notch and a second portion with the first diameter on an opposite side of the circumferential notch. The circumferential notch includes a portion with a second diameter that is different from the first diameter.

The above described features and advantages, as well as others, will become more readily apparent to those of ordinary skill in the art by reference to the following detailed description and accompanying drawings. While it would be desirable to provide a solenoid that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 6 shows a cross-sectional view of the spool of FIG. 2 taken along a centerline of the spool;

FIG. 21A shows a perspective view of one embodiment of the sleeve member of FIG. 21A;

FIG. 21B shows a perspective view of another embodiment of the sleeve member of FIG. 21A;

DESCRIPTION

General Starter Arrangement

Figure 1:
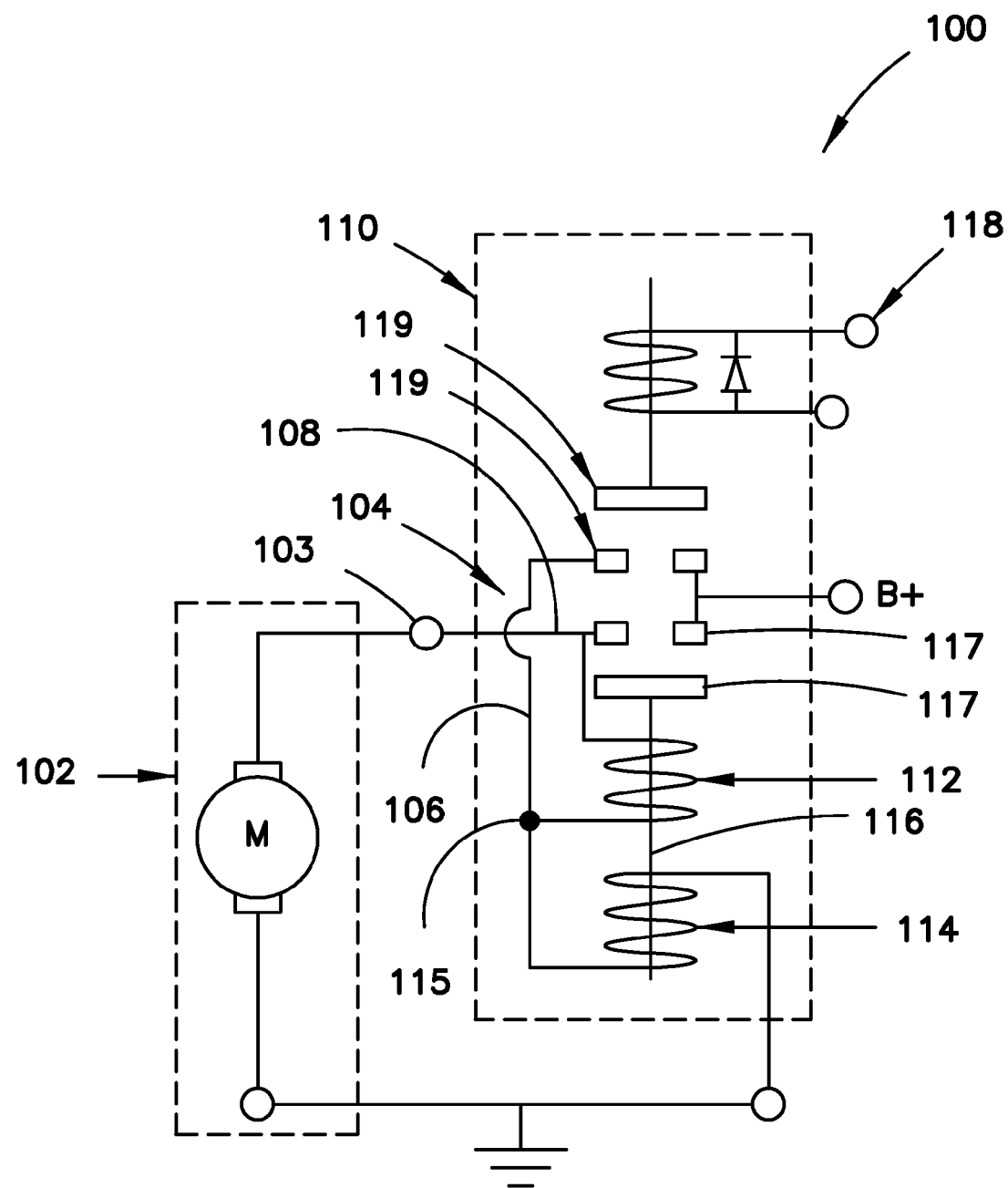
FIG. 1 shows a schematic diagram of a vehicle starter including a motor and solenoid.

With reference to FIG. 1, in at least one embodiment a starter 100 for a vehicle comprises an electric motor 102 and a solenoid 110. Although not shown in the FIG. 1, the starter 100 also includes a drive mechanism and pinion gear, similar to the conventional starter assembly 200 described above with reference to FIG. 15. The electric motor 102 in the embodiment of FIG. 1 is positioned in a motor circuit 104 that is configured to connect the motor to the vehicle battery (not shown) via the B+ terminal. The solenoid 110 is positioned in the motor circuit 104 to facilitate connection of the motor to the vehicle battery. The solenoid includes a pull-in coil 112, a hold-in coil 114, a plunger 116, and an ignition switch 118.

The motor circuit 104 of FIG. 1 includes a first current path 106 and a second current path 108 configured to provide electrical power to the electric motor 102. The first current path 106 begins at the B+ terminal, travels across the contacts 119 of the ignition switch 118, continues to node 115, travels through the pull-in coil, and ends at the input terminal 103 of the electric motor 102. Accordingly, this first current path 106 is only a closed path when the contacts 119 of the ignition switch 118 are closed.

The second current path 108 begins at the B+ terminal, travels across the motor contacts 117 associated with the plunger 116 and ends at the input terminal 103 of the electric motor 102. Accordingly, this second current path 108 is only a closed path when the plunger 116 has closed the motor contacts 117. Moreover, when the second current path 108 is closed, the first current path 106 is shorted by the second current path 108, and no current flows through the pull-in coil 112. Upon closing of the ignition switch 118, the solenoid 110 and motor 102 cooperate to provide a soft start motor engagement system for a vehicle.

Axially Adjacent Coils

Figure 2:
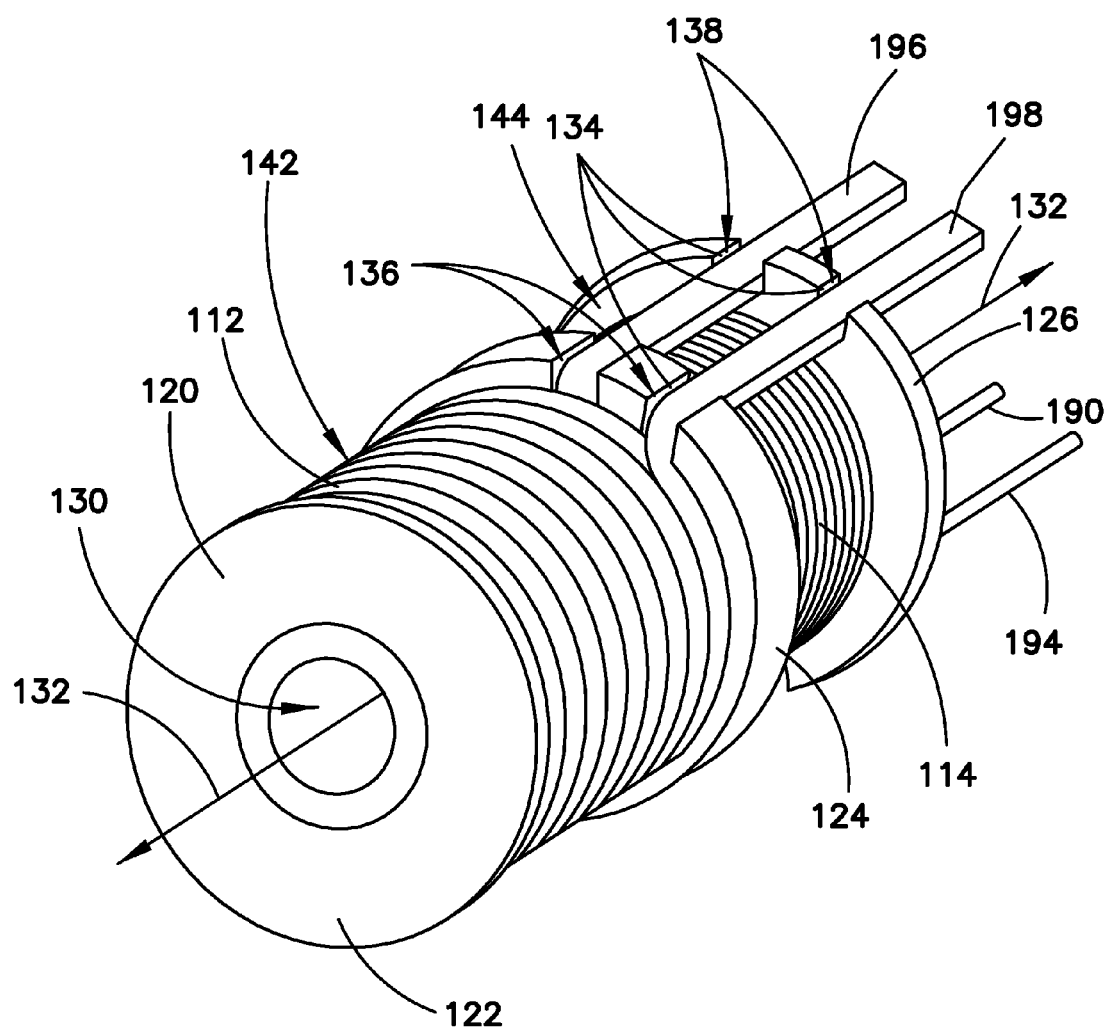
FIG. 2 shows a perspective view of a spool, pull-in coil, and hold-in coil of the solenoid of FIG. 1.

FIG. 2 shows the pull-in coil 112 and the hold-in coil 114 of the solenoid 110 positioned on a spool 120 of the solenoid 110. In the embodiment of FIG. 2, the pull-in coil 112 and the hold-in coil 114 are adjacent to one another in an axial direction of the spool 120. The axial direction is represented in FIG. 2 by axis 132.

The pull-in coil 112 is comprised of a first length of wire wound around a first portion of the spool 120 to form a first plurality of conductor windings (i.e., turns). The wire for the pull-in coil 112 has a relatively large cross-sectional area such that the resistance of the conductor windings is relatively low. Similarly, the hold-in coil 114 is comprised of a second length of wire wound around a second portion of the spool to form a second plurality of conductor windings (i.e., turns). The wire for the hold-in coil 114 is has a relatively small cross-sectional area such that the resistance of the conductor windings is relatively high.

The pull-in coil 112 and the hold-in coil 114 are retained in a side-by-side arrangement on the spool 120. In the embodiment of FIG. 2, the spool 120 is a single component comprised of a glass-filled nylon material. However, it will be recognized that the spool may alternatively be comprised of different materials. The spool 120 may be manufactured using any of various known processes, such as a straight pull mold or other molding process.

The spool 120 includes a first end flange 122, a middle flange 124, a second end flange 126, and a hub 128. The hub 128 of the spool 120 is generally cylindrical in shape and provides a coil retaining surface for the pull-in coil 112 and the hold-in coil 114. Although a right circular cylinder is shown in the embodiment of FIG. 1, it will be recognized that the hub 128 make take on other forms, including cylindrical and non-cylindrical forms. Furthermore, the term "spool" as used herein refers to any appropriate solenoid coil holder, regardless of whether the hub is provided as a cylinder or if flanges are included on the ends of the hub.

The hub 128 in the embodiment of FIG. 2 extends from the first end flange 122 to the second end flange 126. The hub 128 defines a cylindrical interior passage 130 that extends through the spool 120 from the first end flange 122 to the second end flange 126. The cylindrical hub 128 also defines a spool axis 132 that extends through the interior passage 130. The spool axis 132 defines a centerline for the spool 120 and an axial direction along the spool.

The first end flange 122 provides an end wall for the spool 120 that is configured to retain coil windings on the spool. The first end flange 122 is generally disc shaped and includes a circular center hole at the interior passage 130 of the spool. This end wall may be solid with a central hole for the plunger passage 130, as shown in FIG. 2, or may include a plurality of openings. Moreover, although the flange 122 is shown as a relatively thin circular disc in the embodiment of FIG. 2, it will be recognized that the end flange 122 may be provided in various different forms and shapes.

The middle flange 124 also provides a wall that is configured to retain coil windings on the spool. The middle flange 124 is positioned on the hub 128 between the first end flange 122 and the second end flange 126, but not necessarily centered between the first end flange 122 and the second end flange 126. Indeed, in the embodiment of FIG. 2, the middle flange 124 is positioned closer to the second end flange 126 than to the first end flange 122. The space between the first end flange 122 and the middle flange 124 provides a first coil bay 142 on the spool 120 where the pull-in coil 112 is wound around the hub 128.

Similar to the first end flange 122, the middle flange 124 in the embodiment of FIG. 2 is also disc shaped. The middle flange 124 is generally thicker than the first end flange and includes coil mounting features 134 such as slots 136 along the outer perimeter of the flange 124. These slots 136 provide a passage for wire leads on the pull-in coil 112. It will be recognized that additional coil mounting features 134 are also possible, and examples of such coil mounting features will be discussed in further detail below with reference to FIGS. 6-12. Although the center flange is shown in FIG. 2 as having a circular perimeter, it will be recognized that the middle flange 124 may be provided in various different forms and shapes. For example, although the middle flange 124 is shown as being solid with a single central opening, the middle flange may also include a plurality of openings.

The second end flange 126 provides another end wall for the spool 120 that is configured to retain coil windings on the spool. The space between the second end flange 126 and the middle flange 124 provides a second coil bay 144 on the spool that is adjacent to the first coil bay 142 in the axial direction. The hold-in coil 112 is wound around the hub 128 at the second coil bay 144. Similar to the first end flange 122, the second end flange 126 is also generally disc shaped and includes a circular center hole at the interior passage 130 of the spool. The second end flange 126 is generally the same thickness as the first end flange 122. Similar to the middle flange 124, includes mounting features 134 such as slots 138 along the outer perimeter of the flange 126. These slots 138 provide a passage for wire leads on the pull-in coil 112 and the hold-in coil 114. The second end flange 126 may be solid, as shown in FIG. 2, or may include a plurality of openings. Moreover, although the second end flange 126 is shown as a relatively thin circular disc in the embodiment of FIG. 2, it will be recognized that the flange 126 may be provided in various different forms and shapes.

As described above with reference to FIG. 2, the spool 120 of the solenoid 110 is configured such that the pull-in coil 112 is positioned adjacent to the hold-in coil 114 of the solenoid in the axial direction. As a result of this adjacent coil arrangement, greatly increased flux leakage can occur around the pull-in coil, as described below with reference to FIGS. 3-5. The increased flux leakage reduces the magnetic force experienced by the plunger as a result of the pull-in coil 112, thus allowing the resistance of the pull-in coil 112 to be low while still minimizing the abutment force issues previously described. At the same time, the adjacent coil arrangement provides for minimal flux leakage with the hold-in coil 114 when the plunger gap is zero and the contacts are closed, thus allowing the number of coil turns in the hold-in coil to be low but maximizing its hold-in force.

Figure 3:
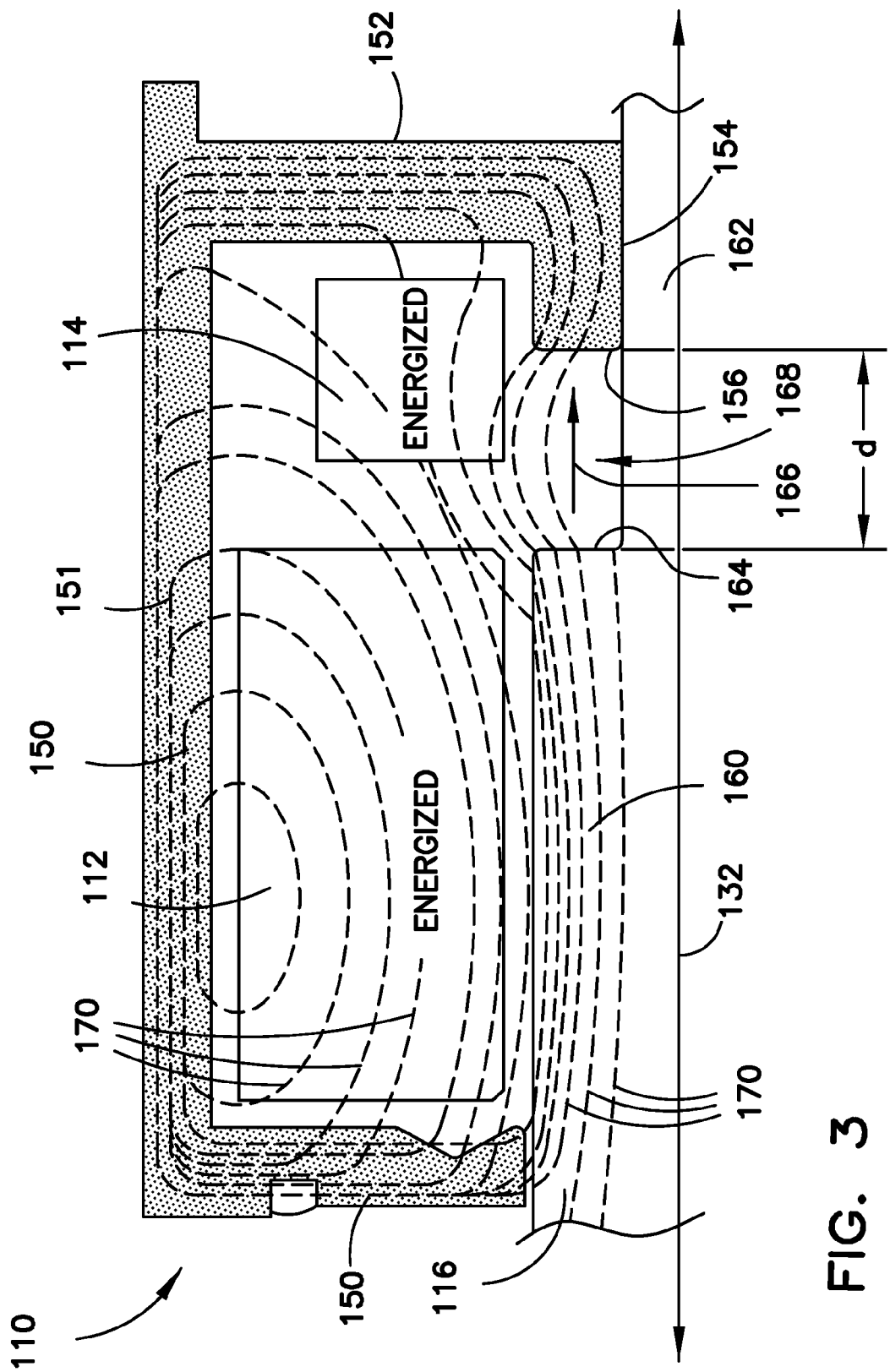
FIG. 3 shows a diagram illustrating lines of magnetic flux through the solenoid when the pull-in coil and hold-in coil of FIG. 2 are energized and the plunger is removed from a plunger stop.
Figure 4:
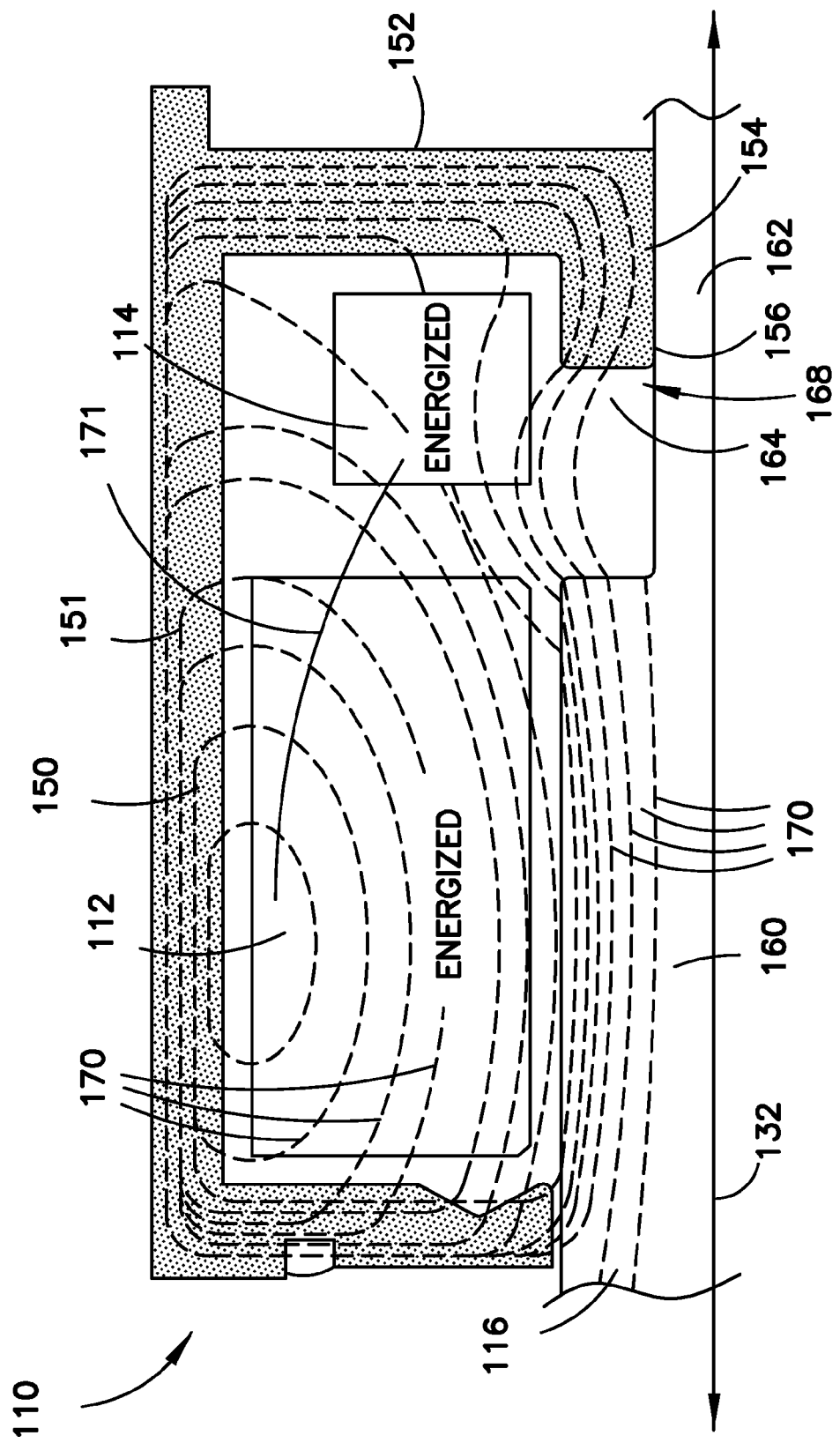
FIG. 4 shows a diagram illustrating lines of magnetic flux through the solenoid when the pull-in coil and hold-in coil of FIG. 2 are energized and the plunger is in transition toward the plunger stop.
Figure 5:
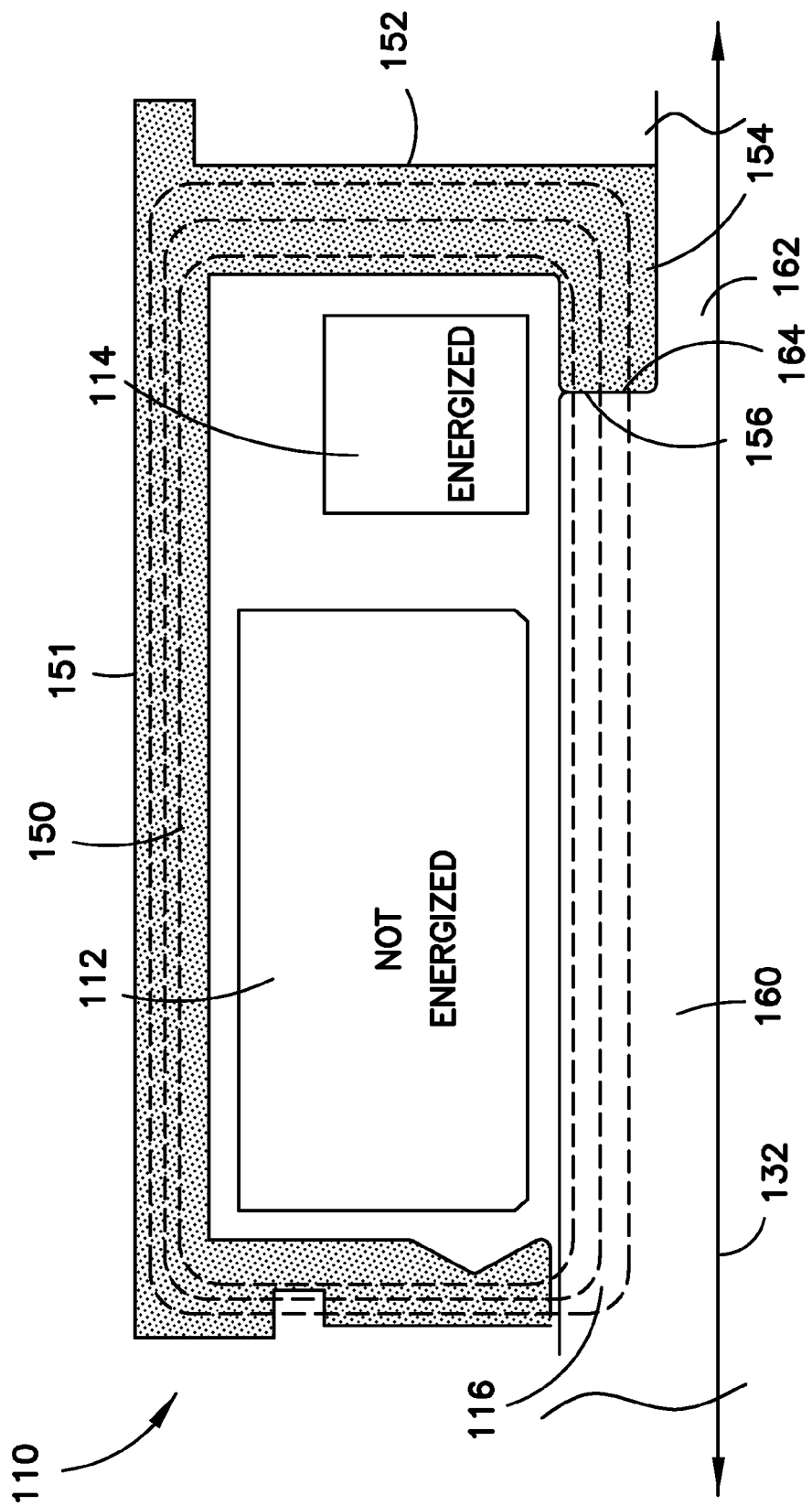
FIG. 5 shows a diagram illustrating lines of magnetic flux through the solenoid when only the hold-in coil of FIG. 2 is energized and the plunger is engaged with the plunger stop.

FIGS. 3-5 are diagrams illustrating lines of magnetic flux through the solenoid when the pull-in coil 112 and the hold-in coil 114 are in various energized and non-energized states. In each of FIGS. 3-5, the pull-in coil 112, hold-in coil 114, plunger 116, solenoid case 150 and plunger stop 152 are illustrated as a cross-sectional view of the solenoid taken radially outward from the solenoid centerline 132. The solenoid spool 120 of FIG. 2 is not illustrated in FIGS. 3-5 for clarity, allowing the lines of magnetic flux 170 passing through the solenoid 110 to be more clearly displayed. However, it will be recognized that the spool 120 is present in the illustrations of FIGS. 3-5 with the pull-in coil 112 and hold-in coil 114 wound around the spool, and the plunger 116 inserted in the interior passage 130 of the spool 120.

With particular reference to FIG. 3, the solenoid 110 is housed by the solenoid case 150. The plunger stop 152 is a generally disc shaped member that is fixed to the solenoid case 150 and extends radially inward from the solenoid case. The plunger stop 152 includes a cylindrical protrusion 154 that fits within an end of the interior passage 130 of the spool 120 (not shown in FIG. 3). This cylindrical protrusion 154 provides a stop surface 156 configured to engage the plunger 116 when the plunger is moved in the axial direction by the pull-in coil 112.

The plunger 116 is a solid component with a cylindrical shape. The cylindrical shape of the plunger 116 is provided with a first larger diameter portion 160 and a second smaller diameter portion 162. A shoulder 164 is formed between the larger diameter portion 160 and the smaller diameter portion 162. The plunger 116 is slideably positioned within the solenoid case 150. In particular, the plunger 116 is configured to slide in the axial direction along the centerline 132 to close an air gap 168 (which may also referred to herein as a "plunger gap") between the plunger shoulder 164 and the stop surface 156 of the plunger stop 152. Each of the plunger 116, the solenoid case 150, and the plunger stop 152 are comprised of a metallic material having relatively low magnetic reluctance, such that magnetic flux lines may easily pass through the solenoid case and the plunger.

With continued reference to FIG. 3, the pull-in coil 112 of the solenoid 110 is positioned within the solenoid case 150 and encircles the larger diameter portion 160 of the plunger 116. The pull-in coil 112 is removed from the plunger stop by a distance d in an axial direction. An axial end of the pull-in coil is aligned with the shoulder 164 of the plunger 116 when the plunger is in the leftmost position of FIG. 3. As discussed previously, the pull-in coil 112 is comprised of a length of conductor including a plurality of windings that wrap around the spool 120 (not shown in FIG. 3). When the pull-in coil 112 is initially energized, the plunger 116 is urged in the axial direction to the right, as indicated by arrow 166.

The hold-in coil 114 is positioned adjacent to the pull-in coil 112 in the axial direction within the solenoid case 150. The hold-in coil 114 encircles the protrusion 154 of the plunger stop 152 and the associated stop surface 156. Accordingly, the hold-in coil 114 also encircles the smaller diameter portion 162 of the plunger that extends through the plunger stop 152. Furthermore, the pull-in coil encircles the air gap 168 when the plunger is in the leftmost position of FIG. 3. As discussed previously, the hold-in coil 114 is comprised of a length of conductor including a plurality of windings that wrap around the spool 120 (not shown in FIG. 3). When the hold-in coil 114 is initially energized, the plunger 116 is urged in the axial direction to the right, as indicated by arrow 166.

Coil Position Within the Solenoid Results in Leakage Flux

As represented by flux lines 170 in FIGS. 3 and 4, when the pull-in coil 112 and the hold-in coil 114 are energized, magnetic flux is created within the solenoid. Leakage flux is any flux that does not contribute to the axial force acting on the plunger 116. The axial force acting to pull the plunger 116 toward the plunger stop 152 and close the plunger gap 168 is dependent upon the total flux linkage between the pull-in coil 112 and the plunger 116 and between the hold-in coil 114 and the plunger 116. When flux leakage occurs, the flux linkage is reduced and so is the resulting force on the plunger 116.

By placing the pull-in coil 112 away from the plunger gap 168 and plunger stop surface 156, as shown in FIGS. 3 and 4, the flux leakage of the pull-in coil 112 is intentionally greatly increased in order to reduce the resulting force on the plunger 116. As shown in FIGS. 3 and 4, rather than traverse directly from the plunger 116 to the plunger stop 152, an increased amount of flux by-passes the plunger 116 and couples directly from one side of the case 150 to the stop 152 or even back to the case 150 outside wall 151. Examples of this leakage flux are indicated in FIG. 3 by lines 171. The leakage flux 171 effectively lowers the magnetic force on the plunger 116 for a given amp-turn excitation of the pull-in coil 112. Since the magnetic force on the plunger 116 is reduced, and because the pinion gear is mechanically connected to the plunger via the pivoting shift lever, the impact and steady-state abutment force of the pinion gear on the ring gear is also reduced. Therefore with the embodiment of FIGS. 1-5, the resistance of the pull-in coil 112 can be made low to increase soft start current to the electric motor 102. Accordingly, the torque of the electric motor 102 is increased during soft start, without having excessive abutment force between the pinion gear and the ring gear which traditionally results from the high amp-turn excitation of the pull-in coil 112.

While coil arrangement in the embodiment of FIGS. 1-5 is configured to increase the leakage flux for the pull-in coil 112, the arrangement is configured to do the opposite for the hold-in coil 114. In particular, the hold-in coil 114 in FIGS. 1-5 is configured to minimize flux leakage with the plunger 116 in order to maximize the electromagnetic hold-in force on the plunger 116 for a given number of turns of the hold-in coil 114. This is accomplished by centering the hold-in coil 114 at the plunger stop surface 156 interface. In this fashion leakage flux 171 is minimized with the hold-in coil 114, and the electromagnetic force on the plunger is maximized. Accordingly, by the geometrical layout of the windings of the pull-in coil 112 and the hold-in coil 114, it is possible to reshape the force-travel curves of the plunger 116 to values more desirable for a starter with a soft start system.

In addition to the benefits related to flux leakage, the side-by-side arrangement for the pull-in coil 112 and the hold-in coil 114 can also have thermal benefits. In particular, with the conventional coil over coil winding such as that shown in FIG. 15, the hold-in coil 214 suffers in strength if the abutment time between the pinion gear 206 and the ring gear is prolonged. During a prolonged abutment, the pull-in coil 212 will rapidly heat and then increase the temperature of the hold-in coil 214. When the temperature of the hold-in coil 214 increases, the electrical resistance increases and the current decreases. This decreases the resulting hold-in force provided by the hold-in coil and thus the risk of the plunger contacts opening and plunger disengagement is increased. However, with the side-by-side coil arrangement shown in the starter embodiment of FIGS. 1-5, the thermal influence of the pull-in coil 112 on the hold-in coil 114 during starting is minimal, as the thermal conductive path resistance is much higher with the two coils separated from one another in the axial direction.

Spool With Additional Mounting Features

Figure 6A:
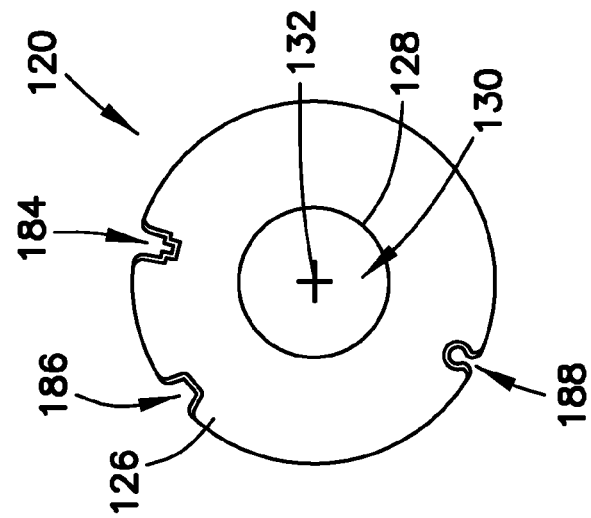
FIG. 6A shows a cross-sectional view of the spool along line A-A of FIG. 6, illustrating one side of a middle flange of the spool.
Figure 6B:
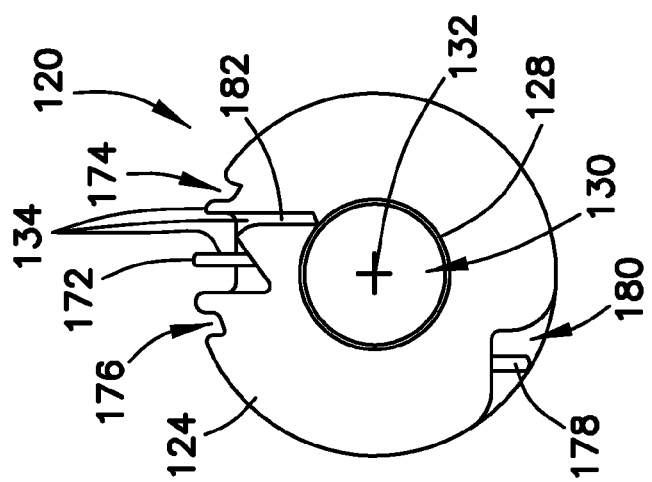
FIG. 6B shows a cross-sectional view of the spool along line B-B of FIG. 6, illustrating another side of the middle flange of the spool.
Figure 6C:
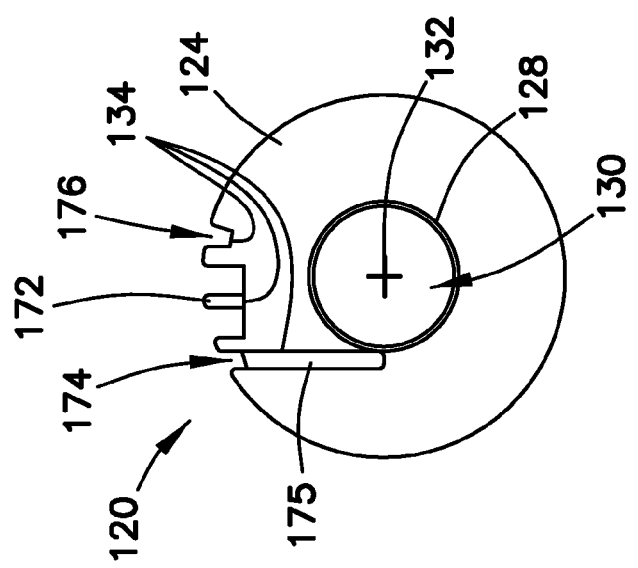
FIG. 6C shows an side view of the spool along line C-C of FIG. 6, illustrating an end flange of the spool.
Figure 7:
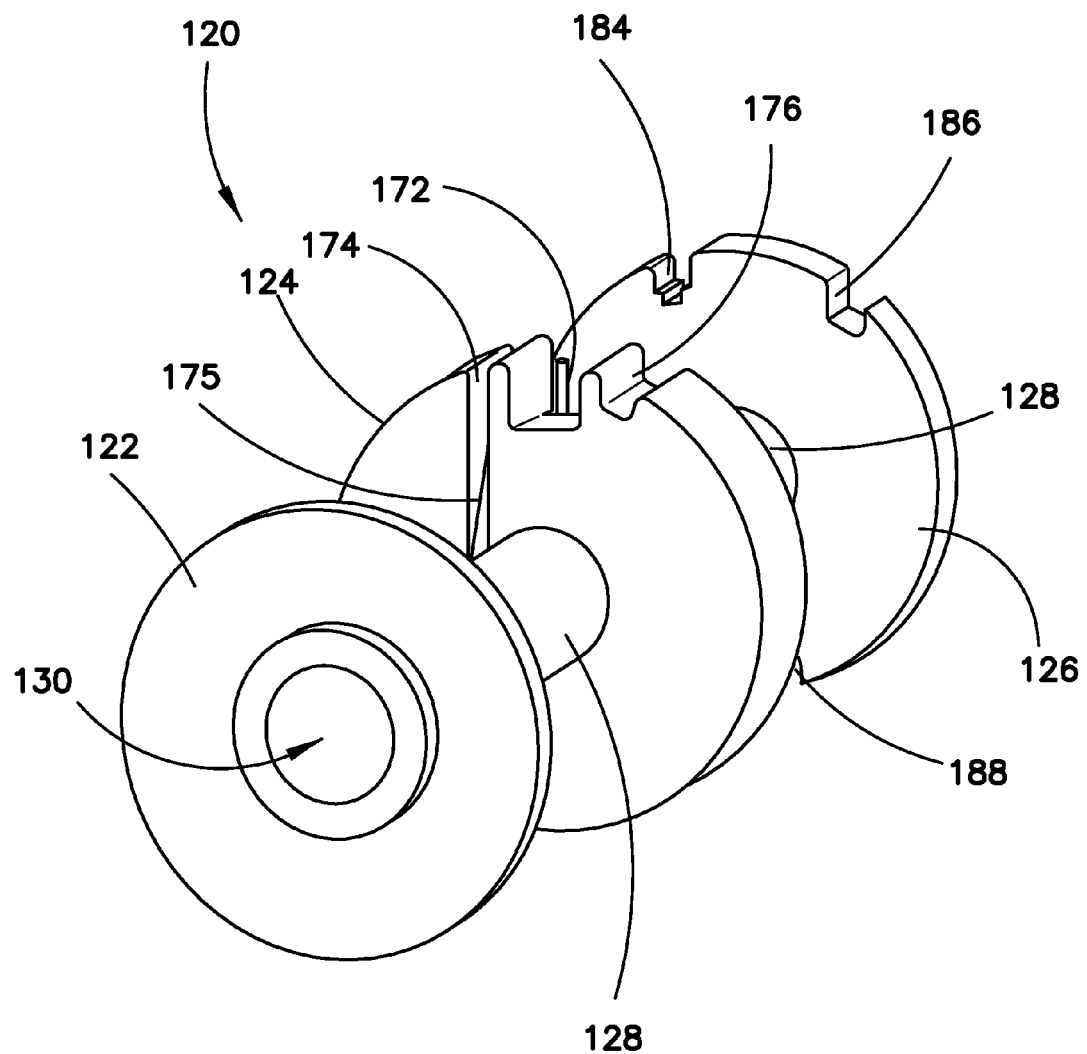
FIG. 7 shows a perspective view of an alternative embodiment of the spool of FIG. 2.

With reference now to FIGS. 6-7, an alternative embodiment of the spool 120 of FIG. 2 is shown. Similar to the spool of FIG. 2, the alternative embodiment of the spool also generally includes a first end flange 122, a middle flange 124, a second end flange 126, and a hub 128. The hub 128 is generally cylindrical about an axial centerline 132, and an interior passage 130 extends through the hub from one end of the spool 120 to the other. However, as explained in further detail below, in the embodiment of FIGS. 6-7, the middle flange 124 and the second end flange 126 include a number of additional mounting features 134.

FIGS. 6A and 7 show views of the side of the middle flange 124 that faces the first coil bay 142. The middle flange 124 includes various mounting features including a first winding post 172 positioned between a lead-in slot 174 and a lead-out slot 176. The first winding post 172 extends radially outward from the centerline of the spool 120 and is configured to engage the wire from the hold-in coil. Sufficient space is provided around the first winding post 172 to allow the hold-in coil 114 to be wrapped around the winding post. Moreover, the first winding post 172 is sufficiently long to allowing wire from the hold-in coil 114 to be wrapped around the first winding post 172 several times. Accordingly, as explained in further detail below, the first winding post 172 provides a mounting feature 134 that allows the hold-in coil to be securely anchored to the spool 120 and also provides a feature for reversing the direction of the turns of the hold-in coil 114 on the spool. A reverse turn post may be advantageous in solenoids for starters with soft start systems, as described in U.S. patent application Ser. No. 12/767,710, filed Apr. 26, 2010, the content of which is incorporated herein by reference in its entirety.

With continued reference to FIGS. 6A and 7, the lead-in slot 174 provides an axial groove in the outer circumference of the middle flange 124 which is designed and dimensioned to receive the wire used to form the pull-in coil 112. Additionally, in the embodiment of FIGS. 6A and 7, the lead-in slot 174 includes an entry ramp 175 for the start lead of the pull-in coil 112. This entry ramp 175 extends in a substantially radial direction to the hub 128 of the spool 120. The entry ramp 175 is configured such that the depth of the slot 174 into the middle flange 124 is slightly tapered moving toward the hub 128. Accordingly, the lead-in slot 174 with entry ramp 175 allows the start lead of the pull-in coil 112 to be guided on the spool 120 from the perimeter of the middle flange 124 toward the hub 128 without consuming space in the first coil bay 142 before the start lead reaches the hub 128. Once the start lead does reach the hub 128, the first layer of turns for the pull-in coil 112 begin. While the lead-in slot 174 has been disclosed as including the entry ramp 175, it will be recognized that in at least one alternative embodiment, the lead-in slot extends directly to the hub without the entry ramp 175 positioned in the slot 174.

Similar to the lead-in slot 174, the lead-out slot 176 provides another axial groove in the outer circumference of the middle flange 124 which is designed and dimensioned to receive the wire used to form the pull-in coil 112. However, unlike the lead-in slot 174 in the embodiment of FIGS. 6A-7, the lead-out slot 176 does not include a ramp portion that extends in the radial direction to the hub 128 of the spool. Instead, the lead-out slot 174 is simply provided on the perimeter of the middle flange 124 and extends radially approximately the thickness of the wire for the pull-in coil in order to allow the finish lead of the pull-in coil to cut across the middle flange 124 once the pull-in coil is completely wound in the first coil bay 142.

With reference now to FIG. 6B, the opposite face of the middle flange 124 is shown. The face of the middle flange 124 shown in FIG. 6B is the face presented to the second coil bay 144 of the spool 120. The first winding post 172, the lead-in slot 174, and the lead-out slot 176 are all visible on this side of the middle flange 124. In addition, this side of the middle flange 124 includes an entry ramp 182 for the start lead of the hold-in coil 114. This entry ramp 182 is similar to the entry ramp 175 for the pull-in coil, extending in a generally radial direction toward the hub 128 and gradually tapering as the ramp extends toward the hub 128. Furthermore, the side of the middle flange 124 shown in FIG. 6B includes a second winding post 178 that is only accessible on this side of the middle flange 124. Accordingly, an indentation 180 is formed in this face of the middle flange 124, and the second winding post 178 is situated in this indentation 180. As explained in further detail below, this second winding post 178 provides a mounting feature for the hold-in coil 114 that may be used as an anchor or a reversing turn feature.

With reference now to FIG. 6C the second end flange 126 includes additional mounting features, including a dual start lead slot 184, a first finish lead slot 186, and a second finish lead slot 188. The dual start lead slot 184 is designed and dimensioned to allow the start leads for both the pull-in coil 112 and the hold-in coil 114 to pass through the perimeter of the second end flange 126. When both start leads are positioned in the slot 184, the start lead for the hold-in coil 114 is positioned radially inward from the start lead for the pull-in coil 112. The first finish lead slot 186 is configured to allow the finish lead for the pull-in coil 112 to pass through the perimeter of the second end flange 126. Similarly, the second finish lead slot 188 is configured to allow the finish lead for the hold-in coil 114 to pass through the perimeter of the second end flange 126.

It will be recognized that the middle flange 124 is thicker in the axial direction than the two end flanges 122 and 126. This increased thickness naturally follows because of the desired separation of the pull-in coil 112 and the hold-in coil 114 in the axial direction such that the coils are properly positioned on the spool 120. However, the increased thickness also provides increased space for the various coil mounting features 134 included on the middle flange 124. Without this middle flange design, the end flanges 122, 126 would need to be the thickness of the center flange to provide the same features, and this would decrease the available space for the coil bays 142, 144.

The winding of the pull-in coil 112 and the hold-in coil 114 on the spool 120 is now described with reference to FIGS. 8-12 in order to provide a better understanding of the design of the foregoing mounting features 134 of the spool 120 and arrangement of the coils 112 and 114 on the spool.

Figure 8:
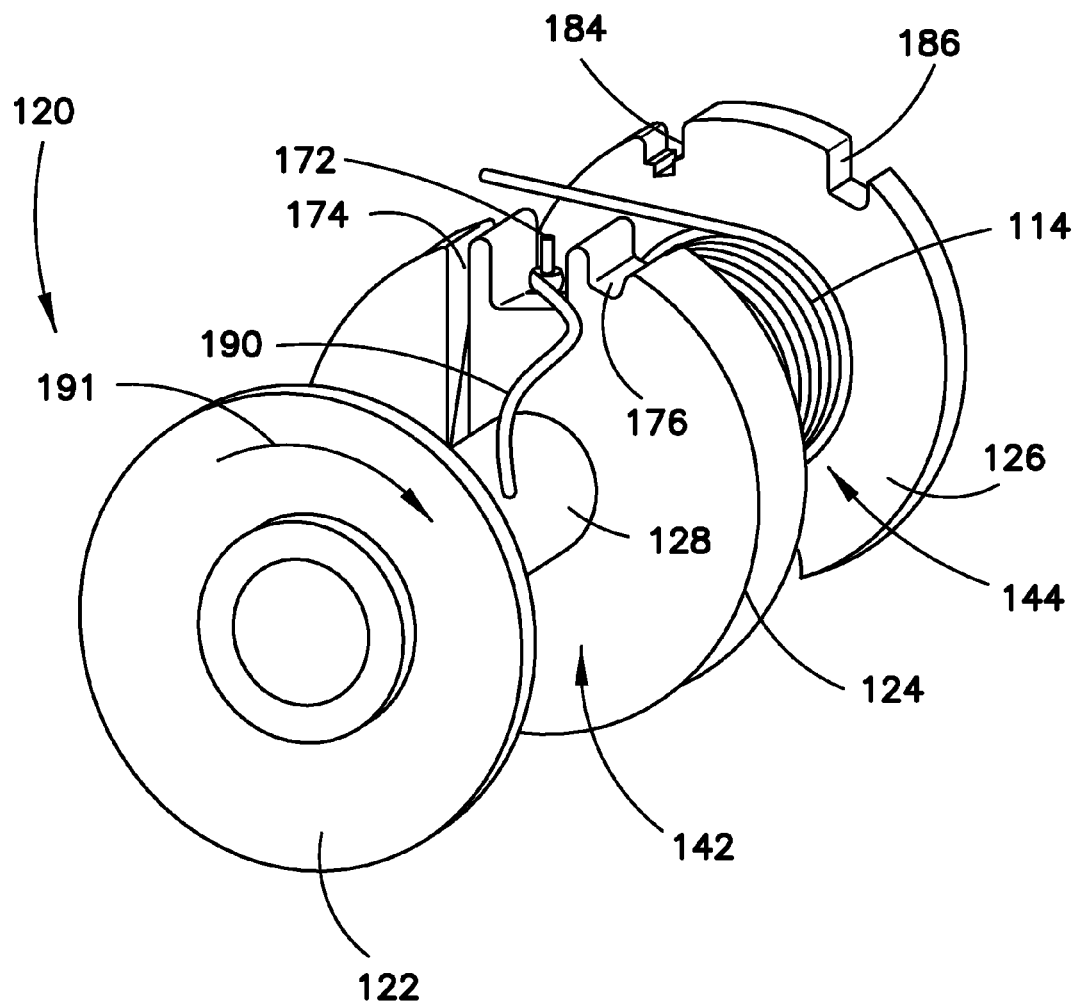
FIG. 8 shows the spool of FIG. 7 with the hold-in coil being wound in one direction on a second coil bay of the spool.

The process of winding the spool 120 begins with the hold-in coil 114. FIG. 8 shows the hold-in coil 114 being wound in the second coil bay 144 of the spool. To begin the winding process, a start lead 190 of the hold-in coil 114 is wrapped around the first winding post 172 in order to anchor the wire for the hold-in coil to the spool 120. The start lead 190 is then channeled down the entry ramp 182 (not shown in FIG. 8) on the middle flange 124 toward the hub 128. After the start lead 190 reaches the hub 128, the spool 120 is rotated in the direction of arrow 191, causing a length of wire from a reel (not shown) to be wound around the hub, and create winding turns for the hold-in coil 114. These winding turns are wound in a first turn direction in the second coil bay 144 of the spool 120.

Figure 9:
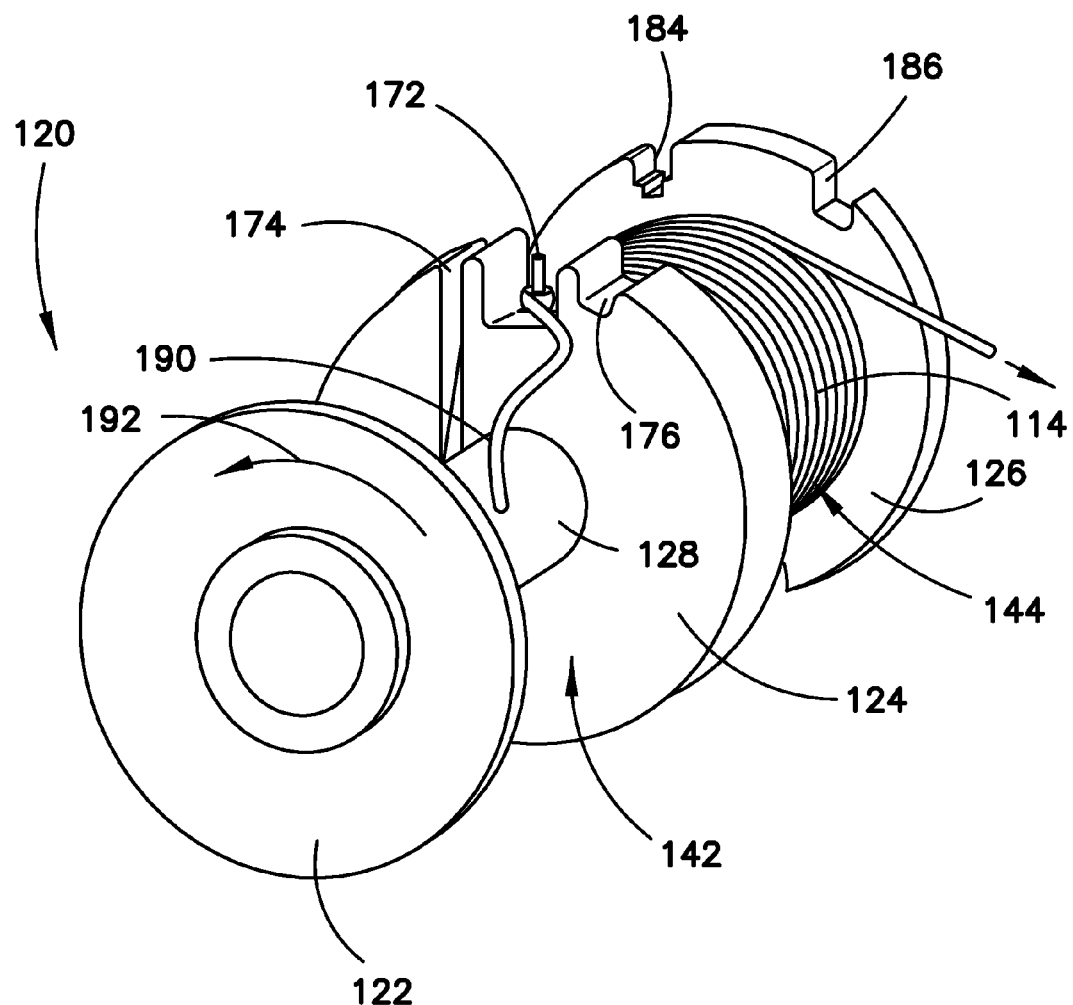
FIG. 9 shows the spool of FIG. 8 with the hold-in coil being wound in an opposite direction on the second coil bay of the spool.

As shown in FIG. 9, after a predetermined number of turns in the first direction are created in the second coil bay 144, the length of wire for the hold-in coil is wrapped around the first winding post, and the spool 120 is rotated in the opposite direction as indicated by arrow 192. Rotation of the spool in the direction of arrow 192 results in reverse winding turns being created in a second direction in the second coil bay 144 of the on the spool 120. Such reverse winding turns may be advantageous on the hold-in coil in a vehicle starter, as described in U.S. patent application Ser. No. 12/767,710, filed Apr. 26, 2010, the content of which is incorporated herein by reference in its entirety.

Figure 10:
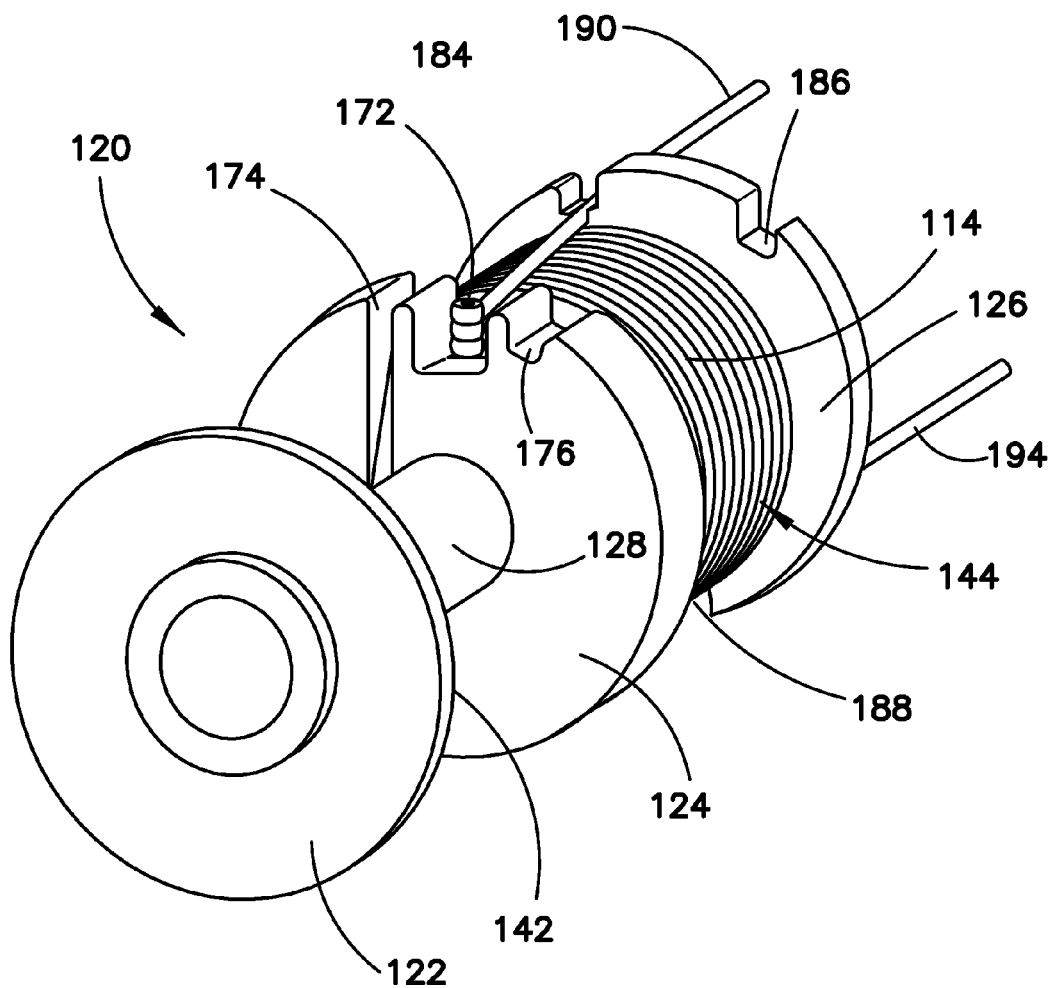
FIG. 10 shows the spool of FIG. 9 with the hold-in coil completely wound on the second coil bay of the spool.

With reference now to FIG. 10, after the reverse winding turns are created, the wire for the hold-in coil is wrapped around the second winding post 178 on the middle flange to securely anchor the hold-in coil in the second coil bay 144. The finish lead 194 of the hold-in coil is then directed through the second finish lead slot 188 on the second end flange 126. The start lead 190 is also directed through the dual start lead slot 184 on the second end flange 126, and this completes the hold-in coil 114 on the spool 120.

Figure 11:
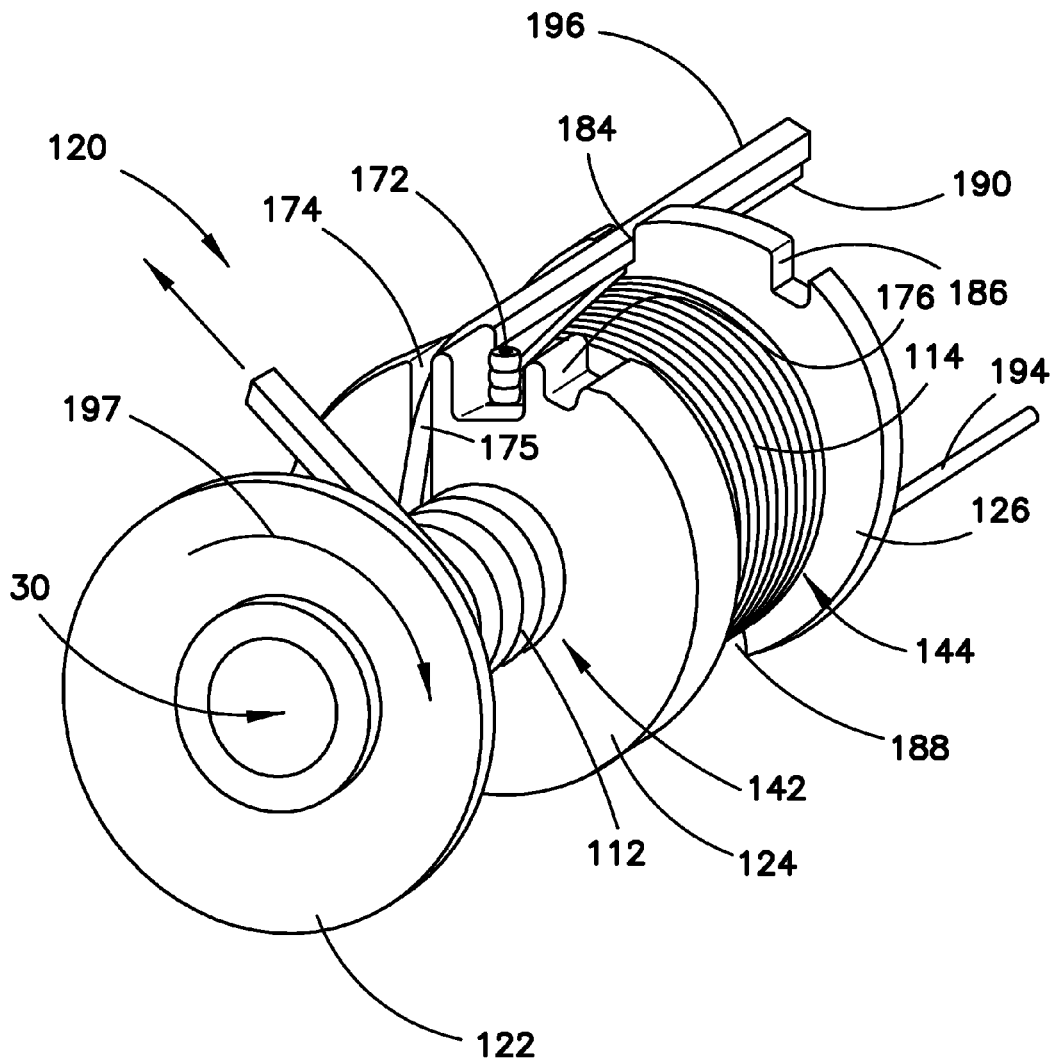
FIG. 11 shows the spool of FIG. 10 with the pull-in coil being wound on a first coil bay of the spool.

FIG. 11 shows the pull-in coil 112 being wound in the first coil bay 142 of the spool 120 after the hold-in coil 114 is wound in the second coil bay 144. To begin winding the pull-in coil, a start lead 196 of the pull-in coil 144 is routed through the dual start lead slot 184 on the second end flange 126 and through the lead-in slot 174 on the middle flange 124. The start lead 196 is then directed down the entry ramp 175 on the middle flange 124 toward the hub 128. After the start lead 196 reaches the hub 128, the spool 120 is rotated in the direction of arrow 197, causing a length of wire from a reel (not shown) to be wound around the hub, and create winding turns for the pull-in coil 112 in the first coil bay 142 of the spool 120.

Figure 12:
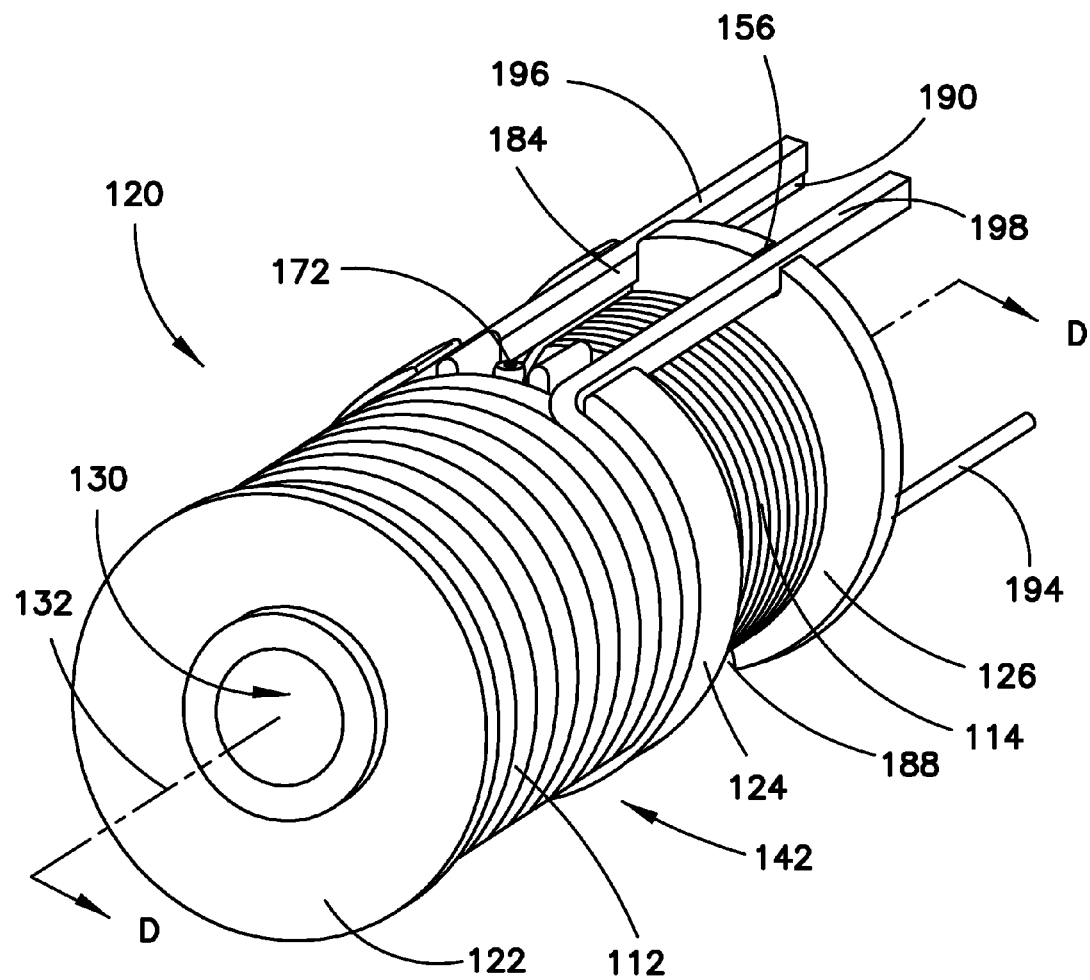
FIG. 12 shows the spool of FIG. 11 with the pull-in coil completely wound on the first coil bay of the spool.

With reference now to FIG. 12, after the turns of the pull-in coil 112 are completely wound in the first coil bay 142, the finish lead 198 is routed through the lead out slot 176 on the middle flange 124. The finish lead 198 is then directed across the turns of the hold-in coil 114 and through the first finish lead slot 186 on the second end flange 126. This completes the winding of the pull-in coil 112 on the spool 120.

Coil Comprised of Rectangular Wire

Figure 13:
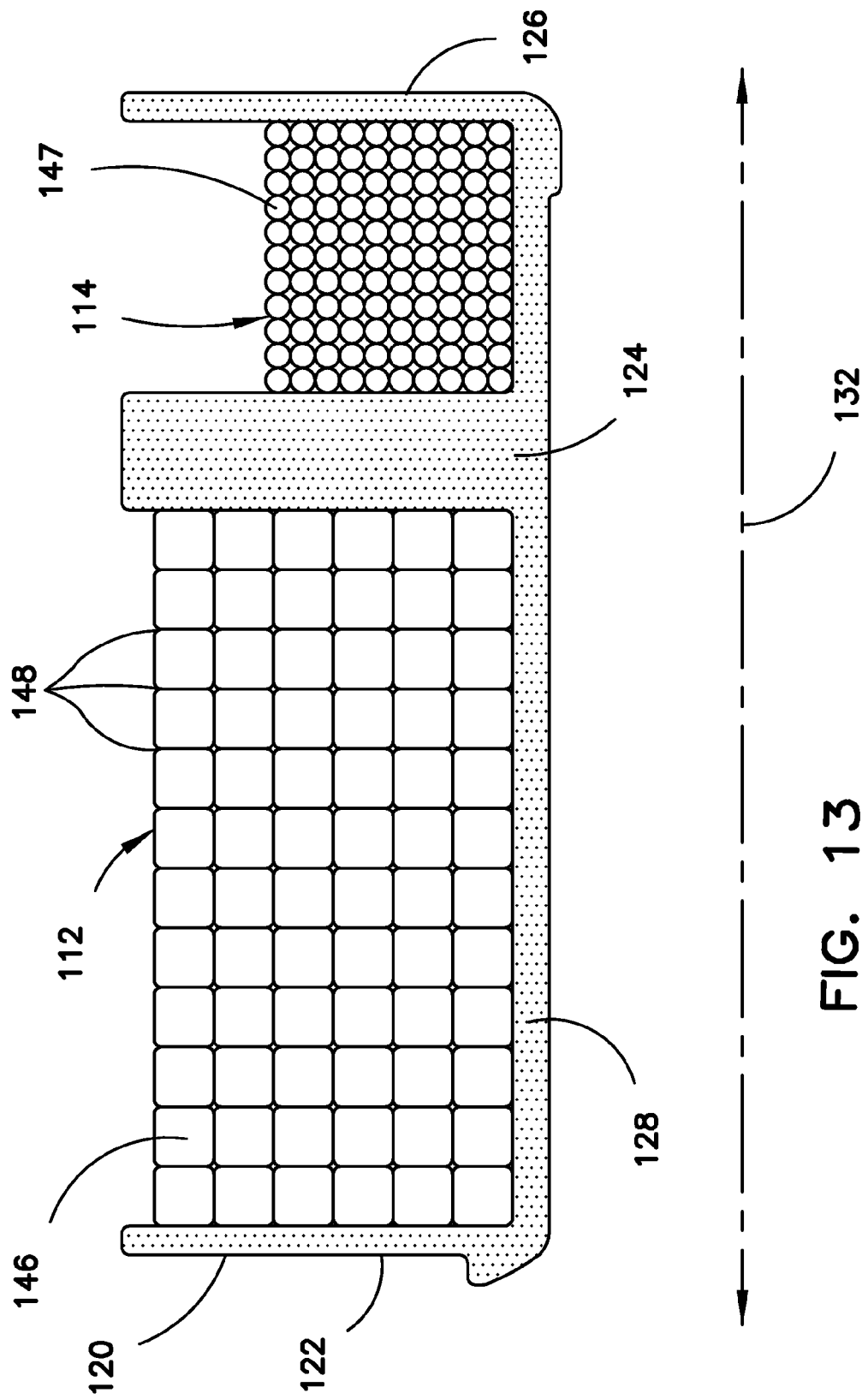
FIG. 13 shows a cross-sectional view of the spool along line D-D of FIG. 12, including the hold-in coil and pull-in coil positioned on the spool.

FIG. 13 shows a cross-sectional view of the spool 120 along line D-D of FIG. 12. In this embodiment of the solenoid 110, the pull-in coil 112 is comprised of rectangular wire 146 (i.e. wire having a substantially rectangular cross-section), and the hold-in coil 114 is comprised of traditional round wire 147. In particular, the rectangular wire 146 used for the pull-in coil 112 is square wire in the embodiments of FIGS. 12 and 13. The rectangular wire 146 is jacketed with a layer of insulation on the outer perimeter. The wire 146 also includes slightly radiused corners 148 that are provided for manufacturing concerns and to avoid any sharp edges on the wire which might cut into the insulation layer on neighboring wires. As explained below, the rectangular wire 146 is advantageous for use in the pull-in coil 112, as it provides an increased stacking factor for the coil while also providing thermal benefits for the coil.

The stacking factor for a coil is the ratio of the total volume consumed by conductors only (i.e., not including air voids between conductors) to the total volume consumed by the complete coil (i.e., including all conductors and air gaps between conductors). Traditional round wire has an effective stacking factor of about 78%. In contrast, the square wire disclosed herein has an effective stacking factor of 90% or more. In particular, the square wire 146 used in the embodiment of FIGS. 12 and 13 has a stacking factor of 92%. As a result, when comparing square wire and round wire, square wire will require less space to provide the same electromagnetic force (i.e., less space to provide the same amp-turns). This space savings is particularly useful for vehicle starters where the starter is often situated in a crowded engine compartment.

Another benefit of the rectangular wire 146 of FIGS. 12 and 13 is that it provides a better thermal conduction path than round wire for transporting the ohmic heat of the coil 112 to the edges of the coil, where the heat may be removed by conduction or convection. With a round wire coil, there is only point contact between adjacent windings, as the conductors layers are wound on top of each other (i.e., two adjacent circles will only touch in a single point). In contrast, as shown in FIG. 13, with square wire 146 the interface between conductors on adjacent windings is much larger since there is contact between adjacent conductors along the entire flat portion of the sides of the conductors. Therefore, the heat being transmitted from coil wire to coil wire is transported via the copper wire rather than the air between the wires, and this copper-to-copper conduction provides a significant thermal advantage. For example, the improved conduction reduces the delta temperature difference between the outside edges of the coil and the typical center hot spot of the coil.

Figure 14:
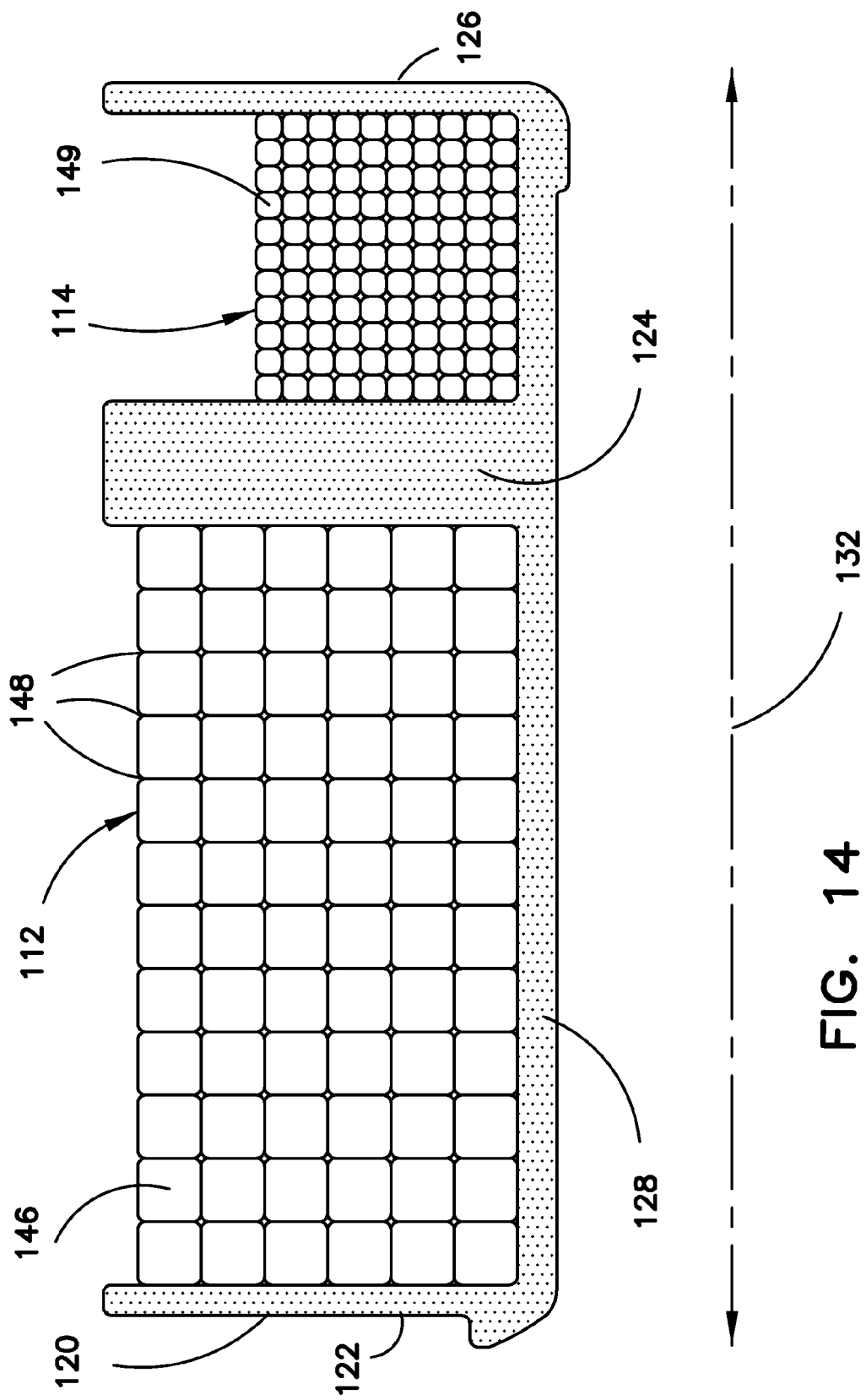
FIG. 14 shows a cross-sectional view of an alternative embodiment of the spool, hold-in coil and pull-in coil of FIG. 13.

With reference now to FIG. 14, yet another alternative embodiment of the solenoid spool 120 and coils 112, 114 is shown. In this embodiment, the pull-in coil 112 is comprised of rectangular wire 146, and the hold-in coil 114 is also comprised of rectangular wire 149. The rectangular wire 146 of the pull-in coil 112 is essentially the same as the rectangular wire 149 of the hold-in coil, but the width of the pull-in coil wire 146 is greater than the width of the hold-in coil wire 149. Accordingly, the hold-in coil wire is square wire with radiused corners. Additionally, the rectangular wire 149 is jacketed with a layer of insulation on the outer perimeter. The rectangular wire 149 of the hold-in coil 114 also provides similar advantages to those described above for the pull-in coil 112. For example, the rectangular wire 149 provides an increased stacking factor for the hold-in coil 114 while also providing thermal benefits for the coil.

Variable Reluctance Plunger

In the above-described embodiments, the plunger 116 has been depicted as having a larger diameter portion 160 and a smaller diameter portion 162, with each portion having a constant cross-sectional profile (i.e. a constant diameter). However, in at least one alternative embodiment shown in FIG. 15, the diameter of the larger diameter portion 160 of the plunger 116 is varied such that a radial gap 70 between a guide plate 72 and the plunger 116 varies as the plunger slides in the axial direction. As a result, the reluctance of the magnetic circuit and the related magnetic force on the plunger can be tailored during the pull-in and hold-in regions of operation, as explained in more detail below.

Figure 15:
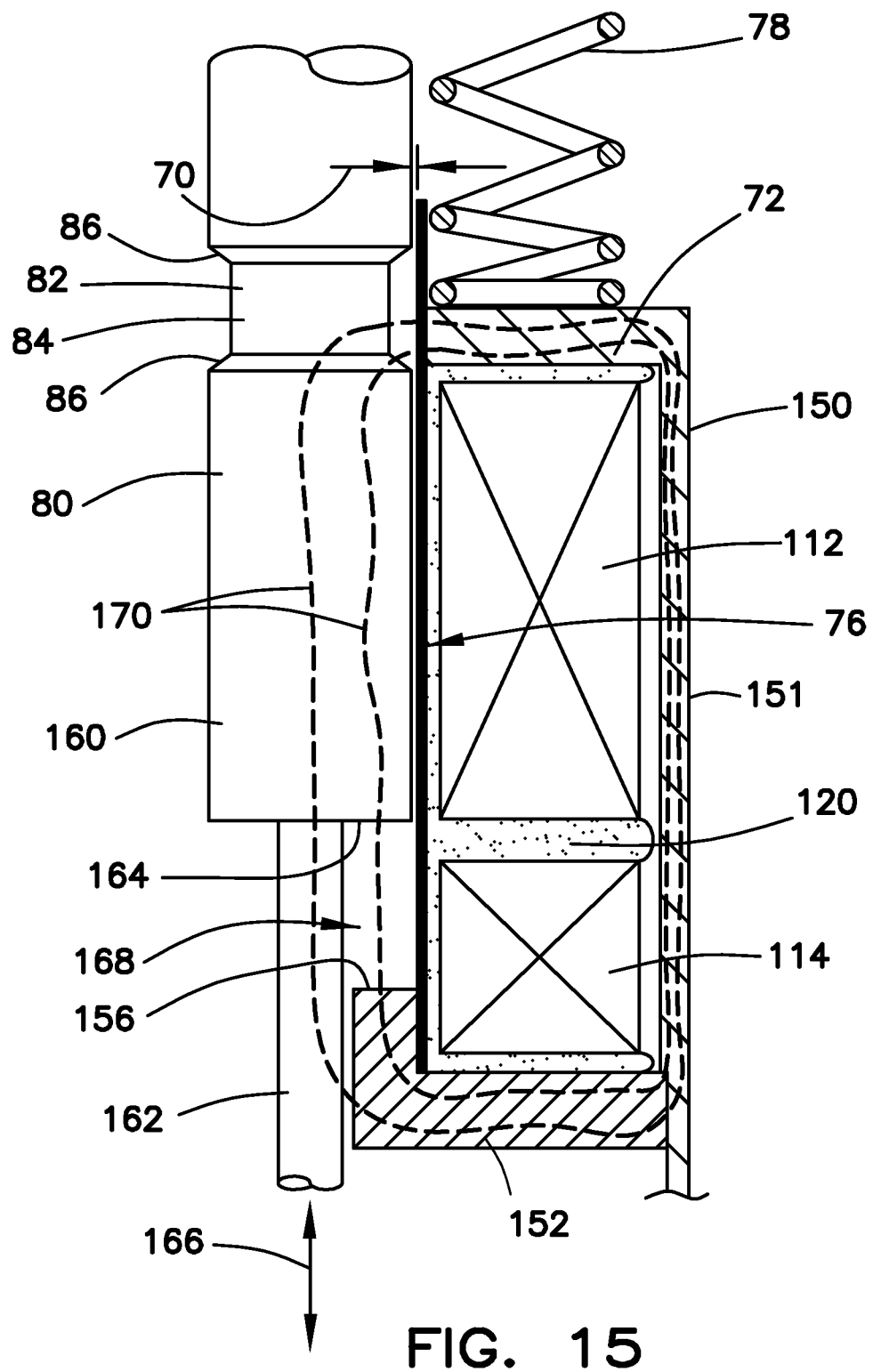
FIG. 15 shows a cross-sectional view of the spool, pull-in coil, and hold-in coil of FIG. 2 with an alternative embodiment of a solenoid plunger with circumferential notch positioned within the interior passage.

As shown in FIG. 15, the larger diameter portion 160 of the plunger 116 includes a substantially cylindrical outer surface 80 with a circumferential notch 82 formed therein. The circumferential notch 82 includes a central cylindrical section 84 with tapered edges 86. The diameter of the central cylindrical section 84 of the circumferential notch 82 is smaller than the diameter of the remainder of the substantially cylindrical outer surface 80 (the diameter being defined in a radial direction, perpendicular to arrow 166). As shown in FIG. 15, the substantially cylindrical outer surface 80 is substantially uniform and extends in the axial direction 166 on both sides of the circumferential notch 82 in the axial direction 166. In the exemplary embodiment of FIG. 15, the substantially cylindrical outer surface 80 has a constant first diameter along a first portion that extends from the shoulder 164 to the circumferential notch 82. At the circumferential notch 82 the diameter of the substantially cylindrical outer surface 80 changes to a smaller second diameter. Then on the opposite side of the circumferential notch 82 (i.e., the side of the substantially cylindrical surface 80 on the opposite side of the circumferential notch 82 from the side adjacent to the shoulder 156), the substantially cylindrical outer surface 80 includes a second portion that is also defined by the first diameter. This second portion continues to extend away from the circumferential notch 82 in the axial direction at some length.

As shown in FIG. 15, the circumferential notch 82 on the substantially cylindrical outer surface 80 of the plunger 116 is positioned opposite the guide plate 72. The guide plate 72 is a generally disc-shaped structure that extends radially outward from the plunger 116. In the embodiment of FIG. 15, the guide plate 72 is provided as part of the solenoid case 150 and is integral with the outside wall 151 of the case 150. The guide plate 72 is positioned adjacent to the end of the spool 120 that is furthest removed from the plunger stop 152. Accordingly, the spool 120 is bordered within the solenoid case 150 by the guide plate 72 and the plunger stop 152.

In the embodiment of FIG. 15, a thin core tube 76 is positioned along the inner diameter of the spool 120 between the plunger 116 and the spool 120. The core tube 76 is fixed in place relative to the spool 120, and the plunger 116 is configured to slide within the core tube 76. The core tube 76 extends in the axial direction the full length of the spool and past the guide plate 72. A plunger return spring 78 is positioned on the opposite side of the guide plate 72 from the spool 120 and engages both the guide plate 72 and the core tube 76. The core tube 76 may be comprised of any of various materials such as, for example, brass or non-magnetic stainless steel.

The extension of the core tube 76 beyond the guide plate 72 of the solenoid case 150 serves at least two purposes. First, the extended core tube 76 provides a continuous sliding surface for the plunger 116. The continuous surface provided by the core tube 76 prevents the edges 86 of the notch 82 from catching on the guide plate 72 during plunger movement when the solenoid coils are activated and deactivated. Second, the extended core tube 76 prevents the return spring 78 (which is located coaxially with the plunger 116 and rests against the outside of the guide plate 72) from being lodged into the notch 82 in the plunger 116 during activation of the coil 112. If this were to occur, the plunger 116 would jam against the guide plate 72 of the case 150.

Figure 16:
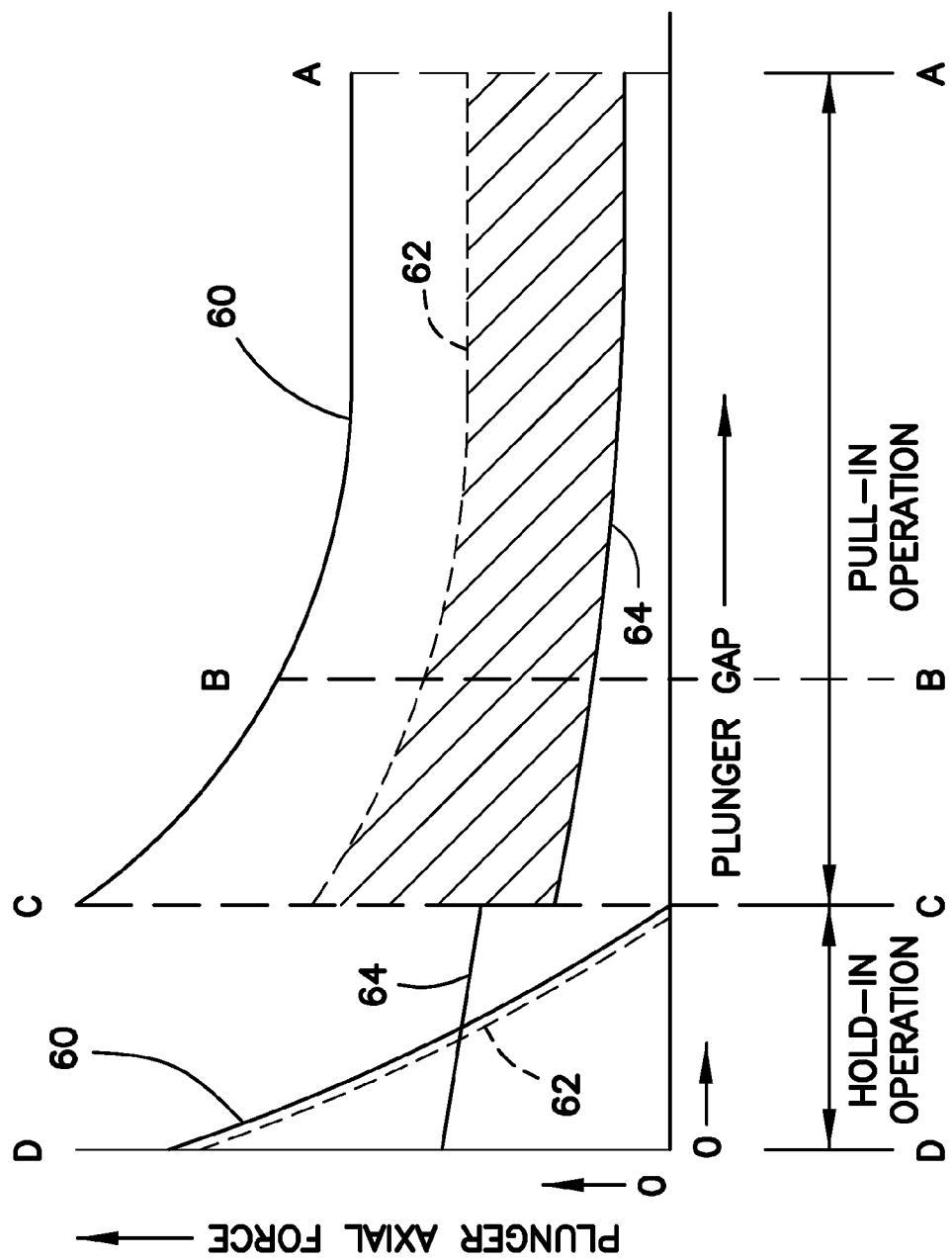
FIG. 16 shows a graph illustrating the difference in plunger axial force between a standard plunger and the variable reluctance plunger of FIG. 15 as the axial plunger gap is closed.

The plunger 116 shown in FIG. 15 provides a design where the reluctance of the magnetic circuit and the related magnetic force on the plunger 116 is variable during the pull-in and hold-in operations of the solenoid 110. FIG. 16 provides a graph illustrating the difference in plunger axial force between a standard plunger (i.e., a plunger with no circumferential notch) and the variable reluctance plunger 116 of FIG. 15 as the axial plunger gap 168 is closed. In this graph, the top solid line curve 60 represents the axial force of the standard plunger with a constant diameter, and the dotted line curve 62 represents the axial force of the variable reluctance plunger 116 with a circumferential notch 82, such as that of the embodiment of FIG. 15. The lower solid line 64 in FIG. 16 represents the axial force of the return spring. Between positions A and C, the lower solid line 64 represents the axial force of the return spring, and between positions C and D, the lower solid line 64 represents the axial force of both the return spring and a contact over-travel spring.

Four different positions of the plunger are specifically noted in FIG. 16. These four positions include the following: position A at the start of the pull-in operation where the axial plunger gap 168 is at a maximum and the pull-in coil 112 and the hold-in coil 114 are initially energized; position B in the middle of the pull-in operation when both the pull-in coil 112 and the hold-in coil are energized; position C at the end of the pull-in operation and start of the hold-in operation where the plunger 116 has moved to a position where the plunger contacts are closed and the pull-in coil 112 is shorted; and position D during the hold-in operation where axial plunger gap 168 is completely closed an only the hold-in coil 114 is energized.

With continued reference to FIG. 16, the net work on the plunger during the pull-in operation is the integral of the net force (magnetic force minus spring force) acting on the plunger over the activation length. This is represented by the area under each of curves 60 and 62 in FIG. 16. This energy is dissipated during impact between the starter drive pinion and ring gear during an abutment.

Figure 17:
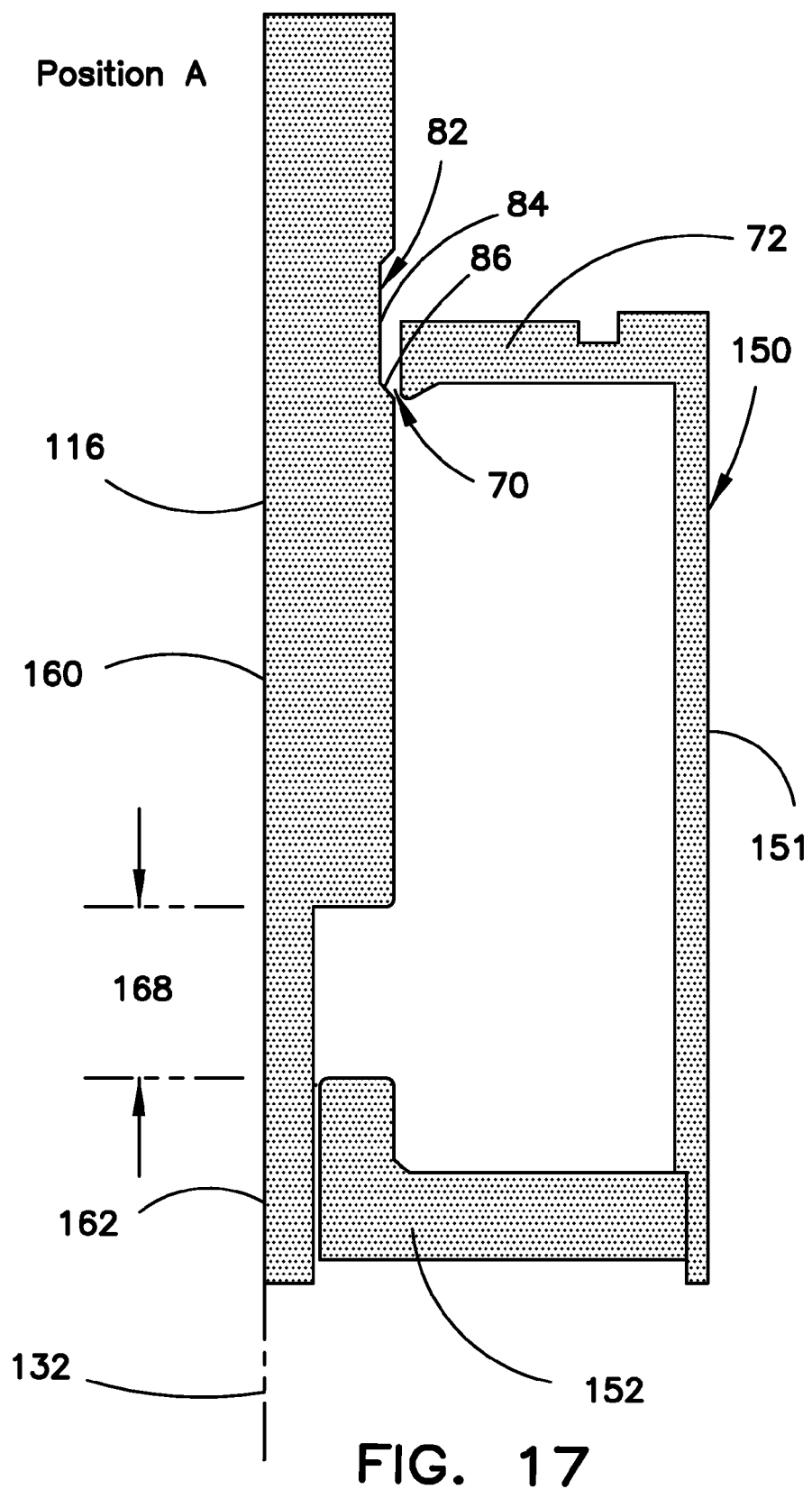
FIG. 17 shows a cross-sectional view of the position of the circumferential notch when the plunger is in position A of FIG. 16.

FIGS. 17-20 show movement of the plunger 116 with circumferential notch 82 at each of the four positions A, B, C and D of FIG. 16. FIG. 17 shows the plunger in position A where the axial plunger gap 168 is at a maximum distance and the pull-in coil 112 and the hold-in coil 114 are initially energized. At this position A, the notch 82 of the plunger 116 is positioned opposite the guide plate 72. In particular, the guide plate 72 is positioned directly across from the front tapered edge 86 of the notch 82 in position A. With the plunger 116 in this position, the radial gap 70 between the plunger 116 and the guide plate 72 is maximized. Because of this large radial gap 70, the resulting magnetic reluctance of the solenoid magnetic circuit is increased. As a result the axial force on the plunger 116 is significantly reduced, as noted by comparing curves 60 and 62 in FIG. 16.

Figure 18:
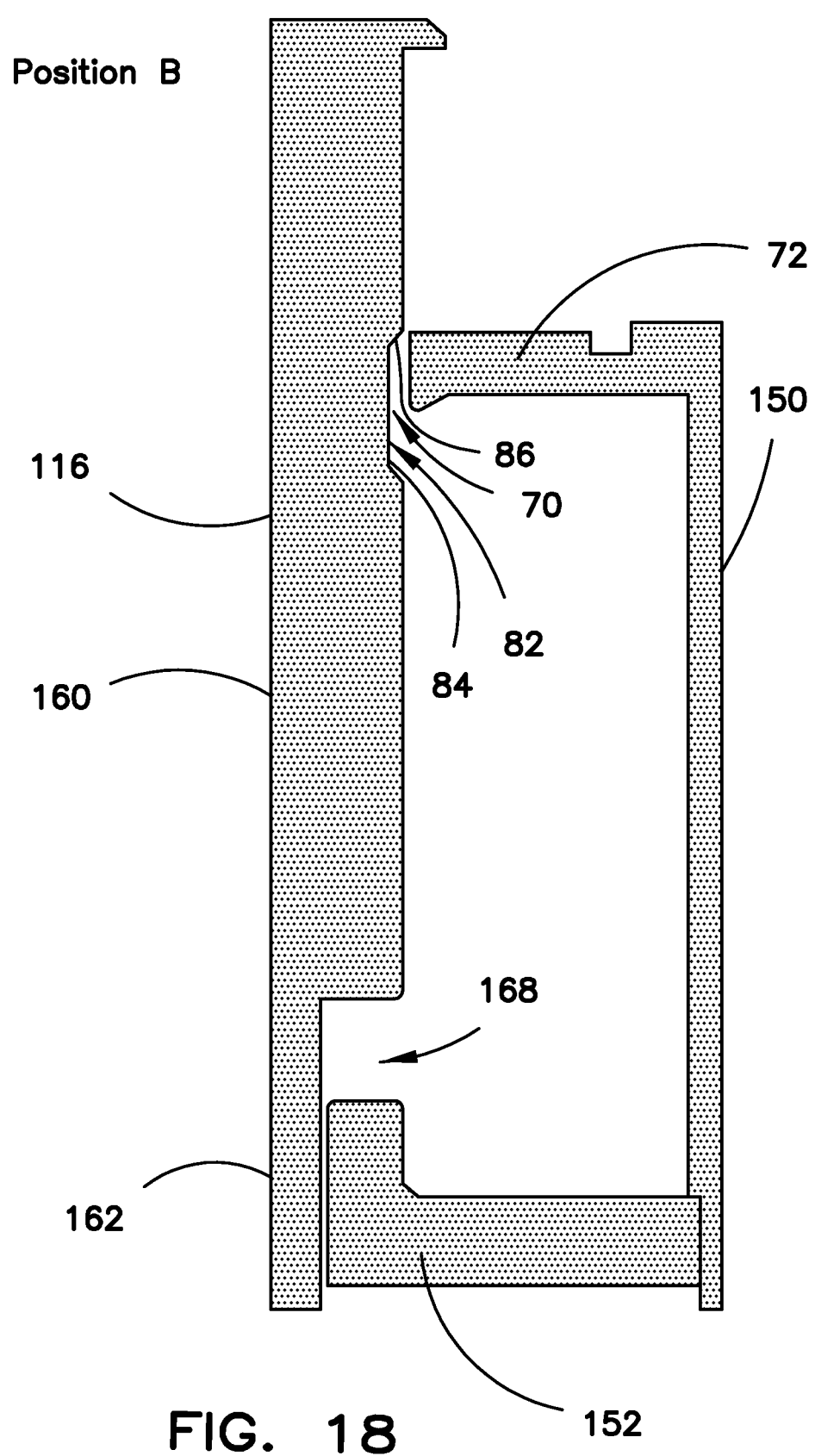
FIG. 18 shows a cross-sectional view of the position of the circumferential notch when the plunger is in position B of FIG. 16.

FIG. 18 shows the plunger in position B where the axial plunger gap 168 is closing as the plunger 116 moves toward the plunger stop 152, with both the hold-in coil 112 and the pull-in coil remaining energized. At this position B, the notch 82 of the plunger 116 remains opposite the guide plate 72. In particular, the guide plate 72 is positioned directly across from the rear tapered edge of the notch 82 in position B. With the plunger 116 in this position, the radial gap 70 between the plunger 116 and the guide plate 72 remains maximized. Because of this large radial gap 70, the resulting magnetic reluctance of the solenoid magnetic circuit remains increased, as the axial force on the plunger 116 is still significantly reduced over that of the standard plunger.

Figure 19:
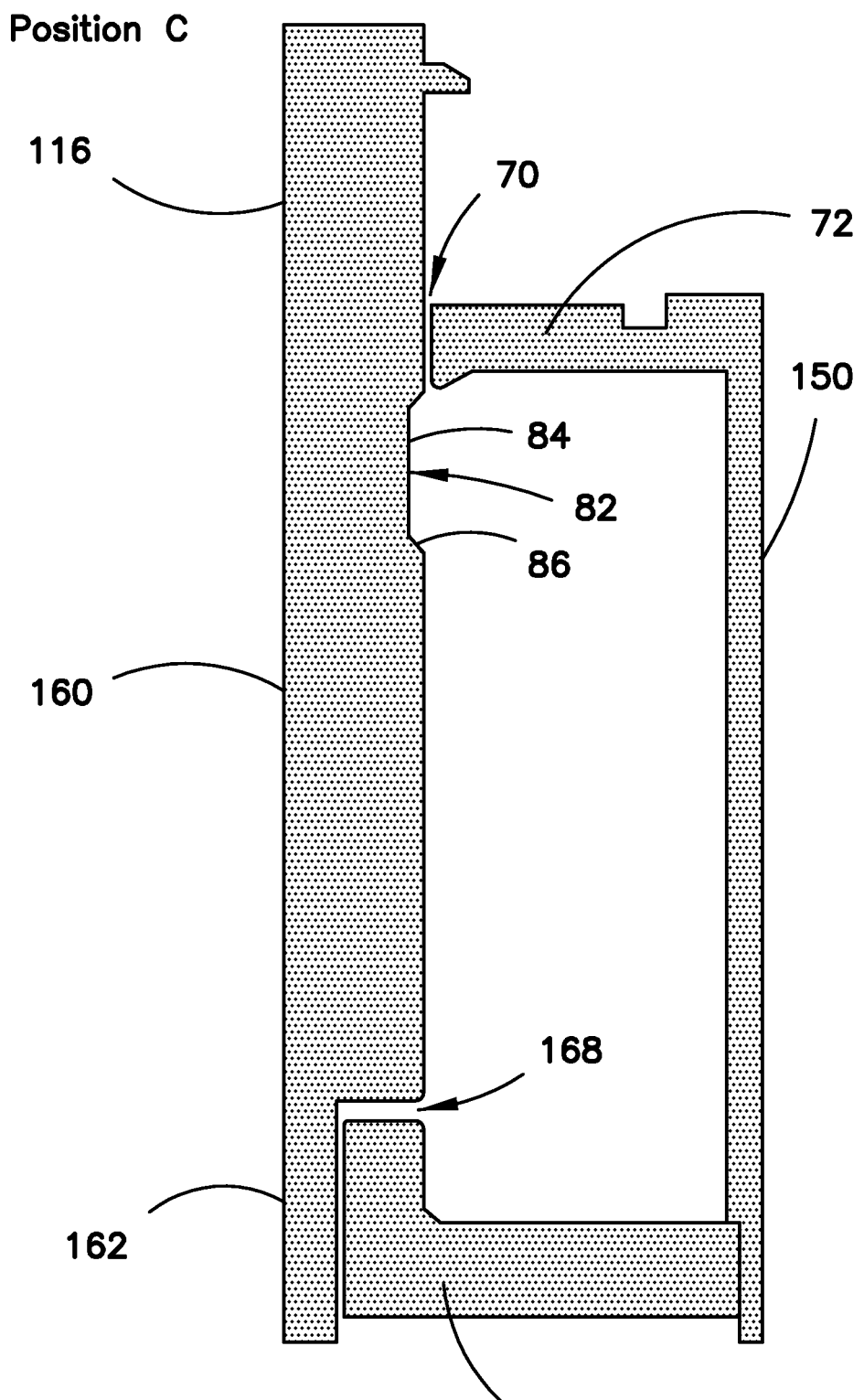
FIG. 19 shows a cross-sectional view of the position of the circumferential notch when the plunger is in position C of FIG. 16.

FIG. 19 shows the plunger 116 in position C where the axial plunger gap 168 is nearly closed and the plunger 116 has moved the plunger contacts 117 (see FIG. 1) to a closed position. With the plunger contacts 117 closed, the pull-in coil 112 is shorted, as described previously with respect to FIG. 1. Additionally, the plunger notch 82 at position C is no longer directly opposite the guide plate 72, but has moved past the guide plate 72 in the axial direction. With the plunger 116 in this position, the radial gap 70 between the plunger 116 and the guide plate 72 is minimized. Because of this small radial gap 70, the resulting magnetic reluctance of the solenoid magnetic circuit is decreased, allowing the hold-in coil 114 to produce the maximum axial force on the plunger 116.

Figure 20:
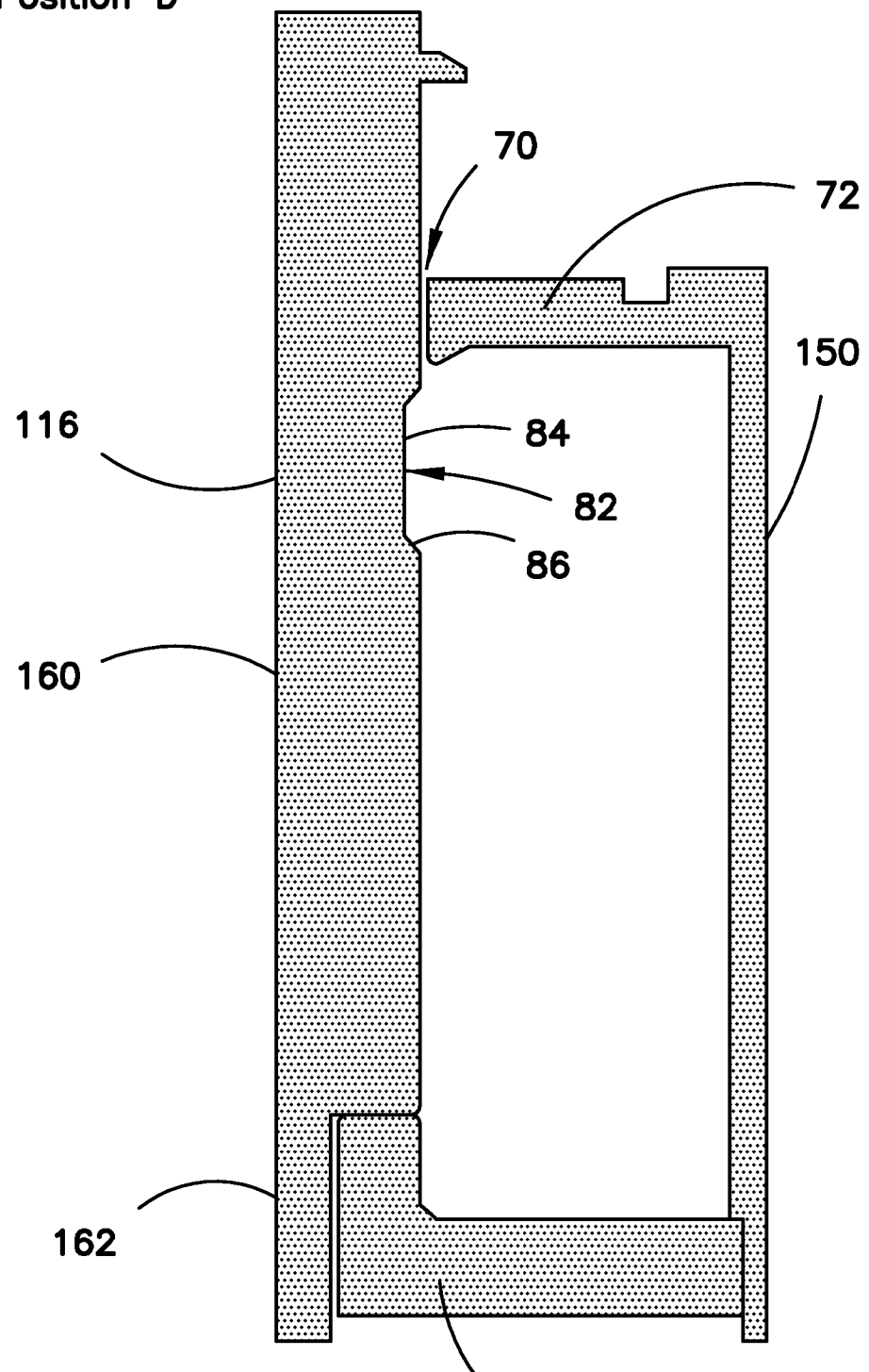
FIG. 20 shows a cross-sectional view of the position of the circumferential notch when the plunger is in position D of FIG. 16.

FIG. 20 shows the plunger in position D where the hold-in coil 114 remains energized and the pull-in coil 112 remains shorted. At this position D, the axial plunger gap 168 is completely closed, as the hold-in coil 114 has moved the plunger 116 into engagement with the plunger stop 152, overcoming both the force of the plunger return spring and the contact over-travel spring (not shown). Moreover, the plunger notch 82 at position D is even further removed from the guide plate 72 in the axial direction such that the radial gap 70 between the plunger 116 and the guide plate 72 remains minimized. Accordingly, with the plunger in this position D, the hold-in coil 114 is allowed to produce the maximum axial force on the plunger.

As described above with reference to FIGS. 15-20, through the use of a variable reluctance plunger, the net work during the pull-in region can be reduced while still accomplishing all of the functional needs of the solenoid. The variable cross-section plunger provides for a variable reluctance magnetic circuit that results in increased magnetic reluctance during the pull-in operation (i.e., compare curves 60 and 62 between points A and C in FIG. 16). Accordingly, the axial force on the plunger is reduced during the pull-in operation, thus reducing the energy dissipated during an impact between the starter drive pinion and the ring gear during an abutment. At the same time, the variable cross-section plunger provides for a variable reluctance magnetic circuit that provides for increased (i.e., standard) magnetic reluctance during the hold-in operation (i.e., compare curves 60 and 62 between points C and D in FIG. 16). This allows the axial force on the plunger to remain at an increased level during the hold-in operation.

Figure 23:
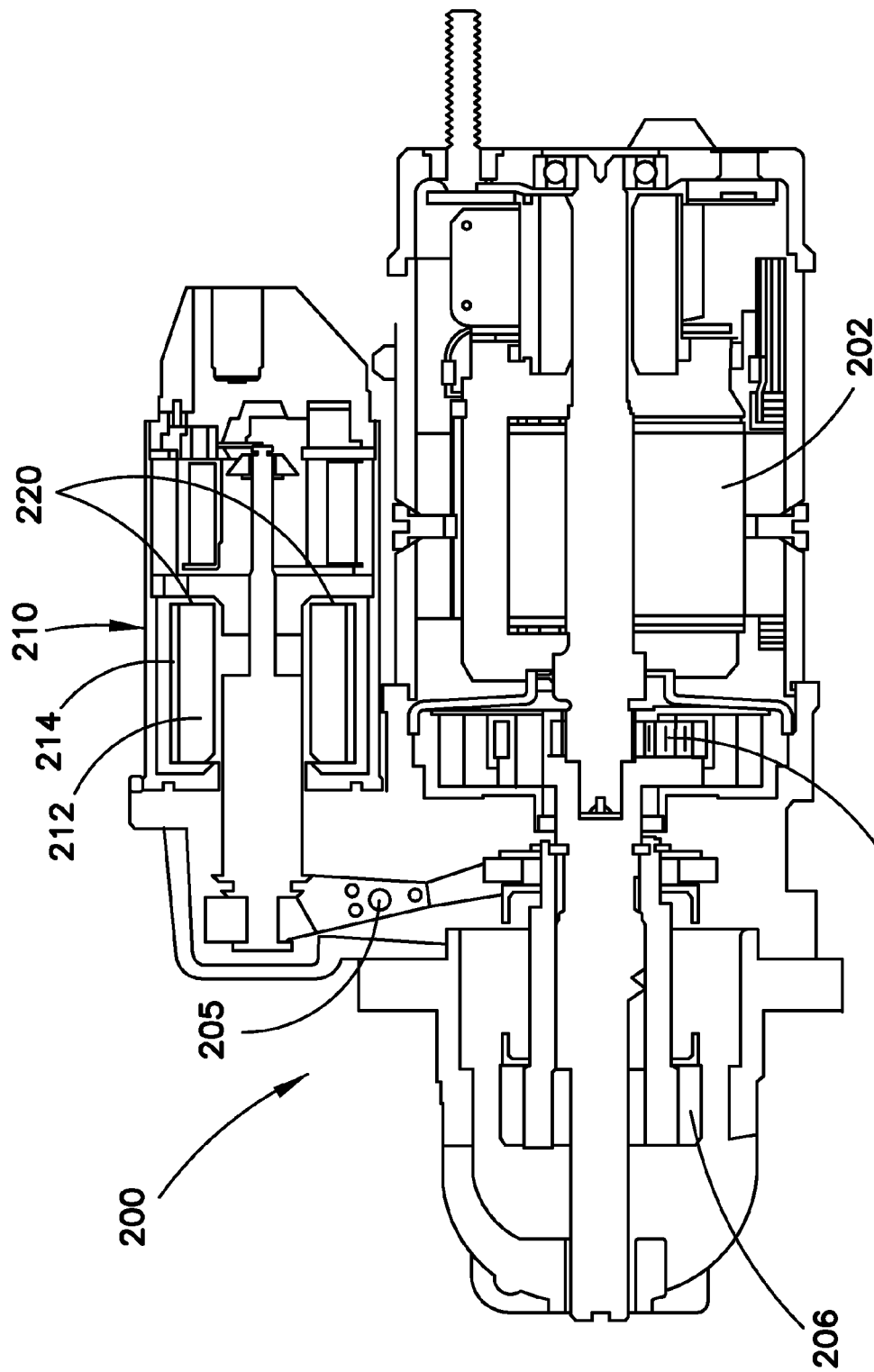
FIG. 23 shows a cutaway view of a conventional starter motor with a soft start starter motor engagement system

While only one embodiment is shown in FIGS. 15-20, it will be recognized that there are numerous alternative embodiments for the plunger, including many possible alternative geometric configurations, which would exhibit the desired magnetic behavior and may be tailored for a given application and need. Moreover, while the variable reluctance plunger 116 has been described in FIGS. 15-20 as used in association with a hold-in coil and a pull-in coil that are axially adjacent, in a other embodiments the variable reluctance plunger may be used in association with a more traditional winding arrangement where the hold-in coil is radially adjacent to the pull-in coil (i.e., hold-in coil wound around the pull-in coil) such as the coil arrangement shown in FIG. 23, or vice-versa (i.e., where the pull-in coil is wound around the hold-in coil).

Variable Reluctance Plunger Sleeve

Figure 21:
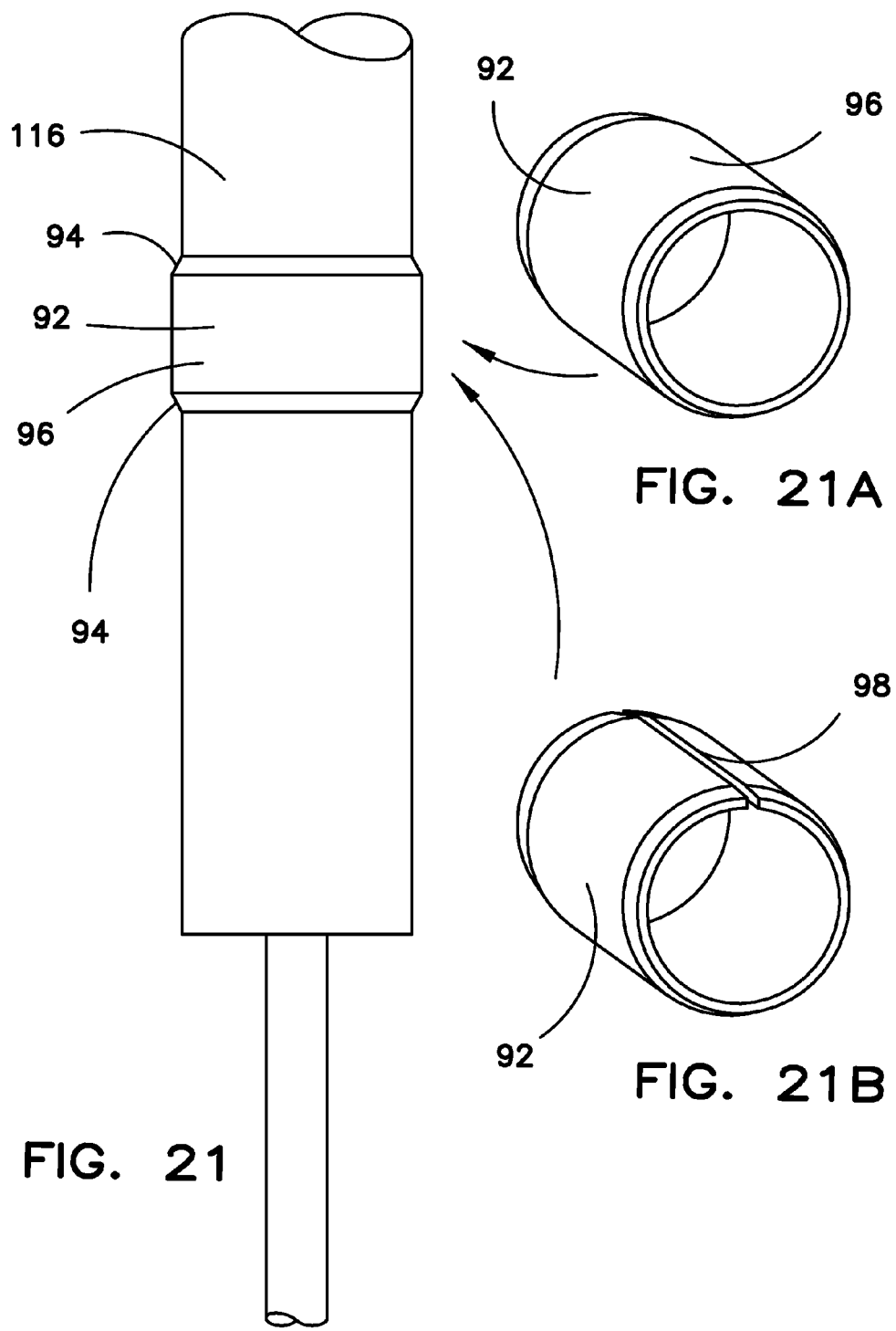
FIG. 21 shows an isolated side view of the plunger with circumferential notch of FIG. 15 with a sleeve member positioned over the circumferential notch.
Figure 22:
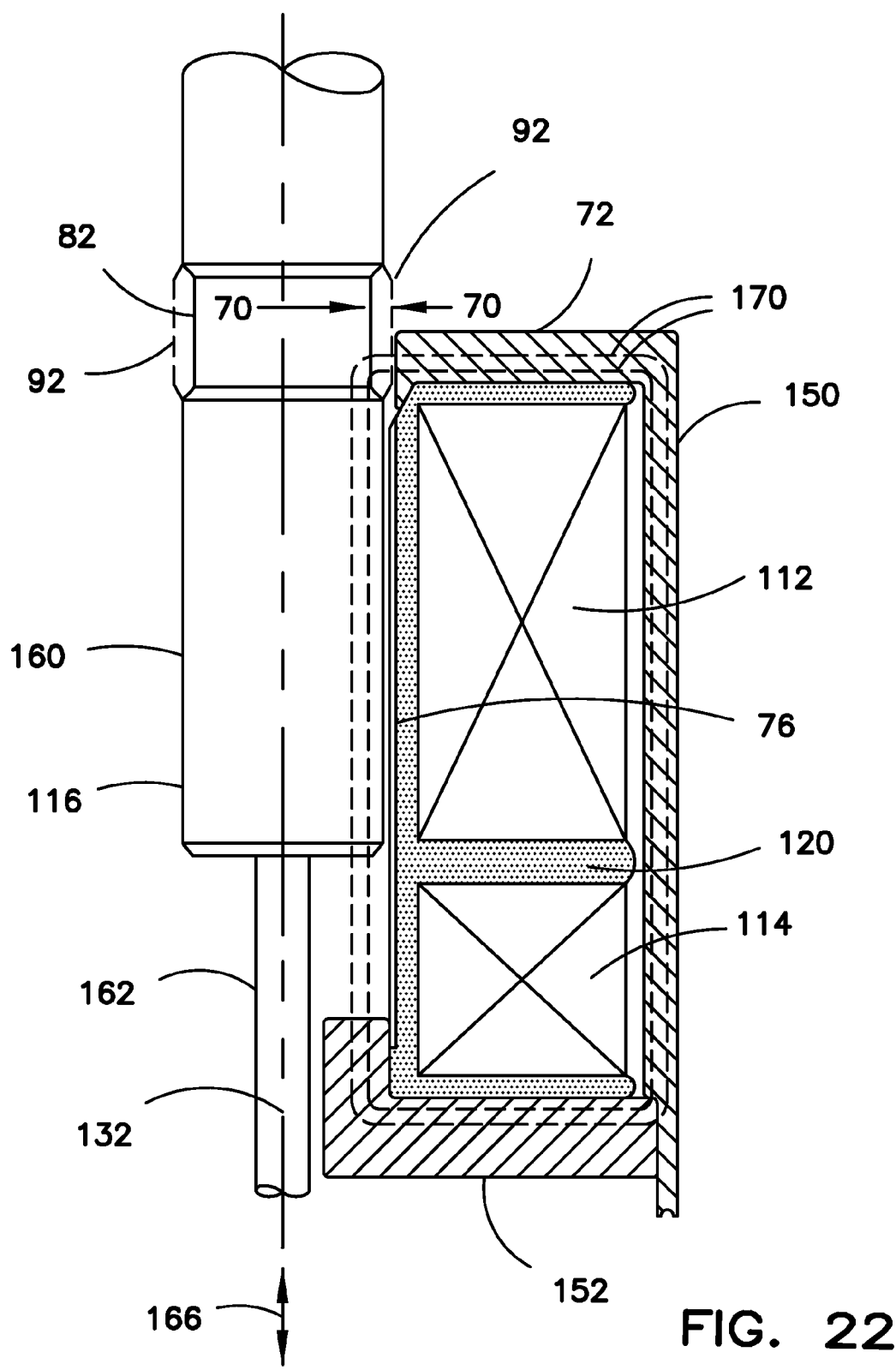
FIG. 22 shows a cross-sectional view of an alternative embodiment of the plunger, spool, pull-in coil, and hold-in coil of FIG. 15 with the sleeve of FIG. 21 positioned on the plunger.

At least one alternative embodiment for the variable reluctance plunger of FIG. 15 is shown in FIGS. 21 and 22. As shown in FIG. 21, a cylindrical sleeve 92 is positioned over the circumferential notch 82 on the larger diameter portion 160 of the plunger 116. The sleeve 92 is slightly larger in diameter than the plunger 116 and may include tapered edges 94. Accordingly, the sleeve 92 may serve as the surface contact between the plunger 116 and the core tube at this end of the solenoid. However, in other embodiments, the sleeve 92 may be substantially the same diameter as the remainder of the large diameter portion 160 or even slightly smaller in diameter.

In at least one embodiment, the sleeve 92 is formed as an over molded plastic sleeve on the plunger 116. In this embodiment, the sleeve 92 is continuous and substantially smooth over its entire outer surface 96, as shown in FIG. 21A. In another embodiment, the sleeve 92 is a separately molded plastic sleeve that is inserted into place over the plunger 116. In this embodiment, the sleeve 92 may include an axial slot 98 to allow the sleeve 92 to increase in diameter when it is inserted over the plunger 116, and then resiliently snap back when the sleeve 92 reaches the circumferential notch 82, thus allowing the sleeve 92 to be secured on the plunger 116.

The sleeve may be formed from any of numerous different materials, including, for example, stainless steel or brass. In at least one embodiment, the sleeve is comprised of polytetrafluoroethylene (PTFE), which is marketed commercially under the name TEFLON®. PTFE provides a low coefficient of friction for the sleeve during plunger movement.

As shown in FIG. 22, by covering the circumferential notch 82 on the plunger 116 with a sleeve 92 (shown in dotted lines in FIG. 22 in order to show its position over the notch 82), the core tube 76 does not need to extend past the guide plate 72 of the solenoid case 150. This is in contrast to the embodiment of FIG. 15 where the core tube 76 extends completely past the guide plate 72. In FIG. 15, the existence of the elongated core tube requires the radial gap between the plunger 116 and guide plate 72 to be increased in order to accommodate the core tube. This increases the reluctance of the magnetic circuit. This increase in magnetic reluctance does not degrade the design of the solenoid 110 during the pull-in operation since, as described previously, it may be advantageous to increase magnetic reluctance during the pull-in operation. However, this increase in magnetic reluctance may preset disadvantages during the hold-in operation since, as also described previously, it is advantageous to decrease magnetic reluctance during the hold-in operation in order maximize the flux and therefore axial force of the plunger. However, in the embodiment of FIG. 22, this additional radial gap distance required to accommodate the extended core tube 76 is eliminated. By reducing the radial gap distance, the reluctance of the magnetic circuit is also reduced. With reduced magnetic reluctance, the resulting axial force on the plunger is increased during the hold-in operation. During the pull-in operation, the circumferential notch 82 acts to provide the desired increased magnetic reluctance.

In addition to the foregoing advantages, the sleeve 92 also eliminates a requirement for the full plunger diameter to overlap a portion of the guide plate for vibration reasons and creasing of the core tube. In particular, the plunger 116 is supported by the interface between the sleeve 92 and the guide plate 72. Moreover, this allows the circumferential notch in the plunger 116 to be extended and further reduces the excessive pull-in magnetic force, particularly at the 'at rest' position.

In addition to the issues addressed by the sleeve 92 itself, a PTFE sleeve is particularly helpful with other issues. For example, when the plunger 116 is at rest a portion of the plunger should be at full diameter within the region of the guide plate 72 so that the vibration force is transmitted from the plunger 116 to the guide plate 72. If not, the vibrational force of the plunger 116 against the unsupported, cantilevered core tube will cause a crease to form in the thin tube. Over time this crease and fretting will require a high mechanical force to overcome it during activation and deactivation and may become high enough to cause solenoid functional failure. A PTFE/stainless steel interface is generally superior to a carbon steel/stainless steel interface for fret resistance. During vehicle or equipment use, the plunger is at the 'at rest' condition. As a result of vibration, the plunger/core tube interface is constantly under small amplitude scrubbing action where the two parts move relative to each other. This can lead to fretting damage. However, when one of the surfaces is PTFE, such as the PTFE sleeve 92 described above, the abrasiveness of the steel-on-steel is eliminated and this problem minimized. Additionally, the lubricity of PTFE helps during engagement and disengagement of the solenoid. In particular, PTFE is more likely to provide a trouble free sliding surface that is not damaged by corrosion on the surface which can sometimes be problematic a conventional metal-on-metal arrangement.

The foregoing detailed description of one or more embodiments of the starter motor solenoid with variable reluctance plunger been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A solenoid for a vehicle starter, the solenoid comprising:
   at least one coil with a passage extending through the coil in an axial direction, the at least one coil configured to generate a magnetic circuit; and
   a ferromagnetic plunger configured to move in the axial direction within the passage when a magnetic force related to the magnetic circuit is applied to the plunger, the plunger including a cylindrical outer surface with a substantially uniform diameter and a circumferential notch, the cylindrical outer surface defining a first portion with a first diameter on one side of the circumferential notch, and a second portion with the first diameter on an opposite side of the circumferential notch, the circumferential notch defining a portion with a second diameter that is less than the first diameter, the first portion having an axial length that is greater than an axial length of the at least one coil, wherein the plunger does not include a permanent magnet, and wherein a reluctance of the magnetic circuit and the related magnetic force applied to the plunger varies based on a position of the circumferential notch as the plunger moves in the axial direction within the passage, the plunger configured to move in the axial direction between a first position where the first portion of the plunger is removed from a plunger stop and a second position where the first portion of the plunger engages the plunger stop.

2. The solenoid of claim 1 further comprising a radially extending plate member separated from the plunger by a radial distance, wherein the radial distance varies when the plunger moves from the first position to the second position as a result of the circumferential notch on the outer surface of the plunger moving in relation to the plate member.

3. The solenoid of claim 1 wherein the portion with the second diameter is a cylindrical portion.

4. The solenoid of claim 1 wherein the at least one coil comprises a first coil and a second coil, wherein the first coil is axially adjacent to the second coil.

5. The solenoid of claim 4 wherein the first coil and the second coil are wound on a spool, and the passage extends through the spool.

6. The solenoid of claim 5 further comprising a plate member positioned adjacent to an end of the spool, the plate member separated from the plunger by a radial distance, wherein the radial distance varies when the plunger moves as a result of the notch moving in relation to the plate member.

7. The solenoid of claim 1 wherein the plunger is a unitary component such that the portion with the second diameter is comprised of a same material as the first portion and the second portion of the cylindrical outer surface.

8. A solenoid for a vehicle starter, the solenoid comprising:
a first coil;
a second coil axially adjacent to the first coil;
a spool with the first coil and the second coil wound on the spool, and a passage extending through the spool;
a plunger configured to move in an axial direction within the passage when a magnetic force related to a magnetic circuit generated by at least one of the first coil and the second coil is applied to the plunger, the plunger including a cylindrical outer surface with a substantially uniform diameter and a circumferential notch, the cylindrical outer surface including a first portion with a first diameter on one side of the circumferential notch, and a second portion with the first diameter on an opposite side of the circumferential notch, the circumferential notch including a portion with a second diameter that is less than the first diameter, wherein the plunger does not include a permanent magnet; and
a plate member positioned adjacent to an end of the spool, the plate member separated from the plunger by a radial distance, wherein the radial distance varies when the plunger moves as a result of the notch moving in relation to the plate member, and wherein a reluctance of the magnetic circuit and the related magnetic force applied to the plunger varies as the radial distance varies.

9. The solenoid of claim 8 further comprising a tube positioned within the spool with the plunger positioned within the tube and configured to move in the axial direction relative to the tube, wherein the tube extends past the plate member.

10. The solenoid of claim 9 further comprising a sleeve member coupled to the plunger and covering the circumferential notch in the plunger.

11. The solenoid of claim 10 wherein the sleeve member is molded over the circumferential notch.

12. The solenoid of claim 11 wherein the sleeve member includes a split groove configured to allow the sleeve member to expand when the sleeve member is coupled to the plunger.

13. The solenoid of claim 12 wherein the sleeve member has a greater diameter than the first diameter.

14. The solenoid of claim 13 wherein the sleeve member is comprised of a polymer material.

15. A solenoid for a vehicle starter, the solenoid comprising:
a first coil;
a second coil axially adjacent to the first coil;
a spool with the first coil and the second coil wound on the spool, and a passage extending through the spool;
a plunger positioned within the passage and configured to slide within the passage in an axial direction between a first position and a second position when a magnetic force related to a magnetic circuit generated by at least one of the first coil and the second coil is applied to the plunger, the plunger including a unitary component with a cylindrical outer surface and a circumferential notch formed in the cylindrical outer surface between a first end and a second end of the unitary component; and
a radial wall positioned adjacent to an end of the spool, the radial wall separated from the unitary component of the plunger by a radial distance, wherein the radial distance varies as a result of the circumferential notch moving in relation to the radial wall when the plunger moves from the first position to the second position, and wherein a reluctance of the magnetic circuit and the related magnetic force applied to the plunger varies as the radial distance varies.

16. The solenoid of claim 15, the cylindrical outer surface of the plunger including a first portion with a first diameter on one side of the circumferential notch, and a second portion with the first diameter on an opposite side of the circumferential notch, the circumferential notch including a portion with a second diameter that is less than the first diameter.

17. The solenoid of claim 15, the unitary component void of a magnet connected thereto.

18. A solenoid for a vehicle starter, the solenoid comprising:
at least one coil with a passage extending through the coil in an axial direction; and
a plunger configured to move in the axial direction within the passage when a magnetic force related to a magnetic circuit generated by the least one coil is applied to the plunger, the plunger including a unitary component having a cylindrical outer surface with a substantially uniform diameter and a circumferential notch, the cylindrical outer surface including a first portion with a first diameter on one side of the circumferential notch and a second portion with the first diameter on an opposite side of the circumferential notch, the circumferential notch including a portion with a second diameter that is different from the first diameter, the first portion having an axial length that is greater than an axial length of the at least one coil;
wherein a reluctance of the magnetic circuit and the related magnetic force applied to the plunger varies based on a position of the circumferential notch as the plunger moves in the axial direction within the passage; and
wherein the at least one coil comprises a first coil and a second coil axially adjacent to the first coil, wherein the plunger is configured to move in an axial direction between a first position and a second position, the solenoid further comprising:
a spool with the first coil and the second coil wound on the spool and a passage extending through the spool; and
a radial wall separated from the plunger by a radial distance, wherein the radial distance varies when the plunger moves from the first position to the second position as a result of the circumferential notch on the cylindrical outer surface of the plunger moving in relation to the radial wall.

* * * * *